(12) United States Patent
Miyamoto et al.

(10) Patent No.: US 6,296,570 B1
(45) Date of Patent: *Oct. 2, 2001

(54) VIDEO GAME SYSTEM AND VIDEO GAME MEMORY MEDIUM

(75) Inventors: Shigeru Miyamoto; Takao Shimizu; Takaya Imamura; Kazuaki Morita; Tsuyoshi Kihara, all of Kyoto (JP)

(73) Assignee: Nintendo Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,724

(22) Filed: Apr. 24, 1998

(30) Foreign Application Priority Data

Apr. 25, 1997 (JP) ...................................... 9-123576

(51) Int. Cl.[7] ...................................... A63F 13/00
(52) U.S. Cl. .............................. 463/30; 463/35
(58) Field of Search ................... 463/1, 2, 5, 7, 463/30, 31, 32, 33, 35

(56) References Cited

U.S. PATENT DOCUMENTS

| | | | | |
|---|---|---|---|---|
| 4,445,187 | * | 4/1984 | Best | 364/521 |
| 4,752,069 | * | 6/1988 | Okada | 273/1 |
| 5,377,997 | * | 1/1995 | Wilden et al. | 273/434 |
| 5,393,071 | * | 2/1995 | Best | 273/434 |
| 5,405,151 | * | 4/1995 | Naka et al. | 273/437 |

* cited by examiner

Primary Examiner—Jessica J. Harrison
Assistant Examiner—Kim T. Nguyen
(74) Attorney, Agent, or Firm—Nixon & Vanderhye P.C.

(57) ABSTRACT

A video game system includes a game machine and a memory medium. The game machine is connected with a controller to be operated by a player and a display device for displaying game images. The memory medium generates player object image data and influencing object image data, as well as generates message data. The message data is a message to teach the player how to operate the controller. A player object and an influencing object are displayed on the display device. Also, the display device displays a message of how to operate the controller.

28 Claims, 31 Drawing Sheets

F I G. 1 0
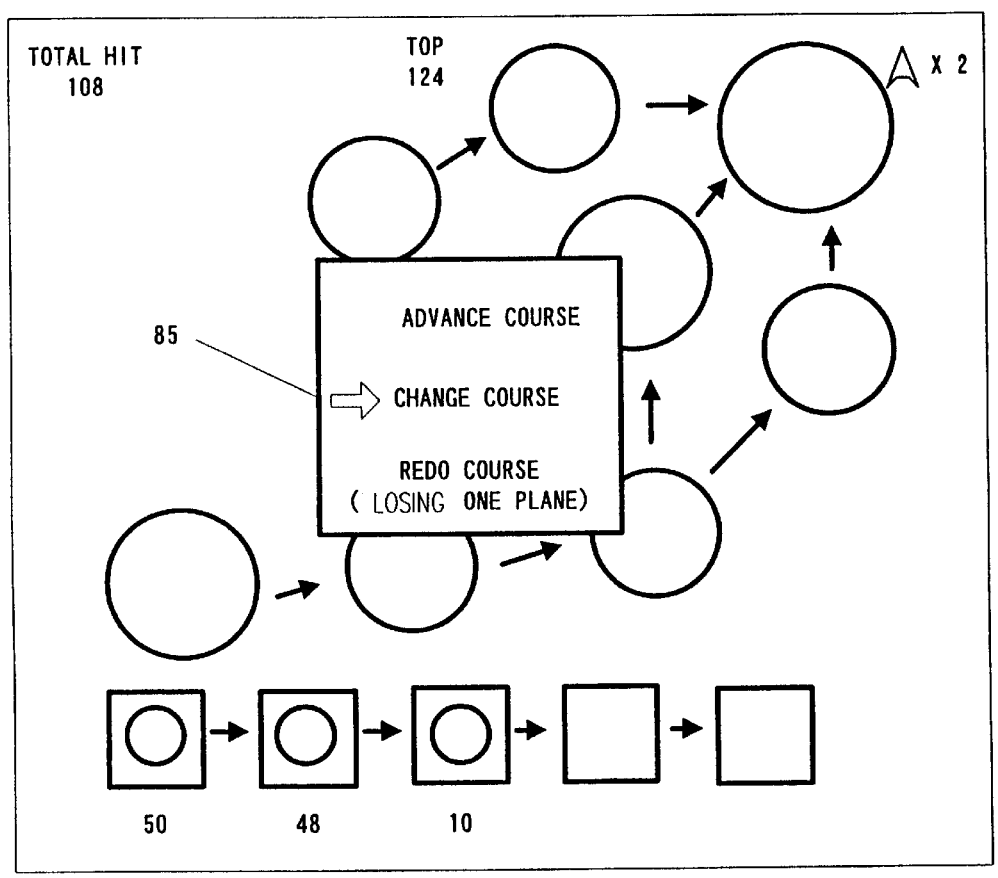

FIG. 13

|  | PERSON | PHRASE | CONDITION | PRIORITY |
|---|---|---|---|---|
| PHRASE 1 | FELLOW 1 | GET OVER WITH BRAKE C BUTTON DOWN ↓ | SITE A | 1 |
| PHRASE 2 | FELLOW 2 | PASS THROUGH BY BOOSTING C BUTTON LEFT ← | SITE B | 2 |
| PHRASE 3 | FELLOW 3 | AIM AT BACK | TIME A FROM FINDING BOSS | 2 |
| PHRASE 4 | FELLOW 4 | REPEL BY ROLLING TWICE DEPRESS Z OR R | SITE C | 1 |
| PHRASE 5 | FELLOW 5 | HELP | AIMED AT BY ENEMY | 1 |
| PHRASE 6 | FELLOW 6 | WE SURVIVED | RESCUING | 1 |
| PHRASE 7 | FELLOW 3 | TACTFULLY USE BOMB | SITE D | 1 |
| PHRASE 8 | HERO | UWAHHHH ··· | $Bd \leq 0$ | 3 |
| PHRASE 9 | BOSS | GWAHHHH ··· | ENEMY'S $Ed \leq 0$ | 0 |

F I G. 1 4
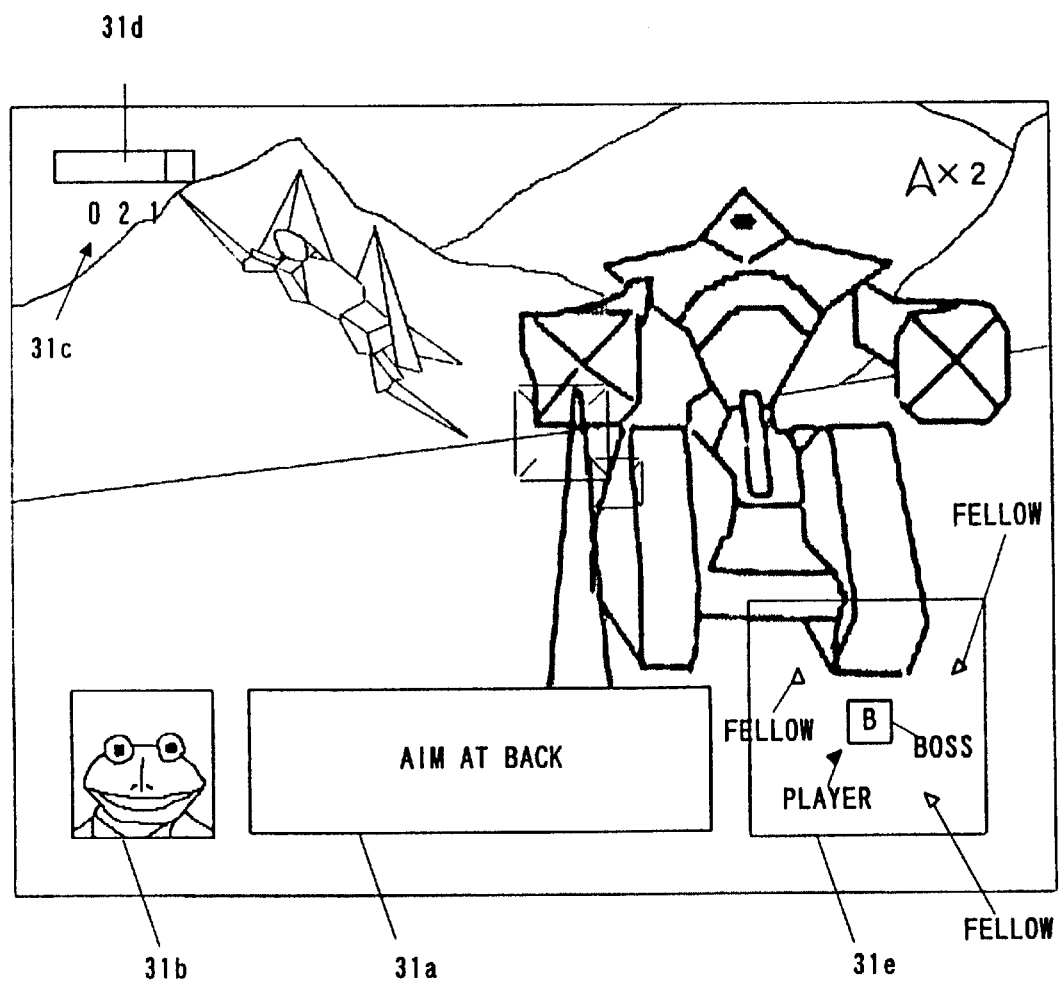

FIG. 15  ENTIRE FLOWCHART
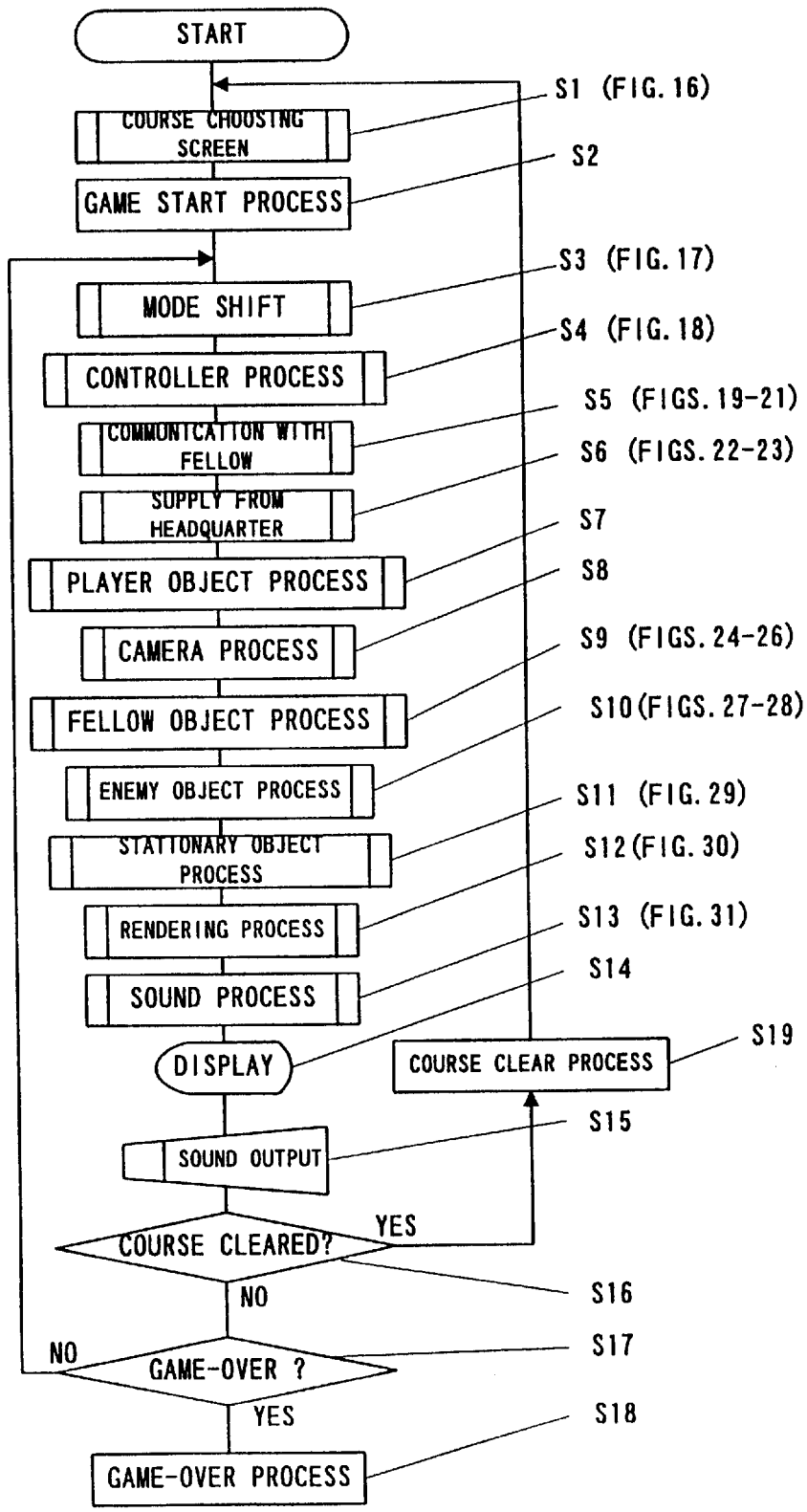

FIG. 22 — MATERIAL REPLENISHING PROCESS 1

VIDEO GAME SYSTEM AND VIDEO GAME MEMORY MEDIUM

BACKGROUND OF THE INVENTION

1. Field of the invention

This invention relates to video game systems and video game processing memory mediums, and more particularly to a video game system and a video game memory medium which are easy for a player to proceed to forward scenes even where complicated operations are required for the game.

2. Description of the prior art

In conventional video games, the functions of switches or buttons on an operating device have been explained in an instruction or an other manual as a means for letting a player or user know as to how to operate the game. The player had to read the instruction manual before beginning the game to learn which switch or button possesses what function for playing the game.

On the other hand, there has been conventional art that is adapted for displaying, in characters, operating methods or functional explanations on switches or buttons when selecting an operational explanation mode on a screen after starting a video game, or displaying explanation about an operating way or function of a switch at an area where no enemy characters appear during the course of a game.

The explanatory descriptions of manipulating method of switches or buttons in an instruction or in a manual is difficult for a player to remember the functions on all the switches required for playing a same using many operational switches or switches requiring complicated operations. In particular, this tendency is prominent for switches for designating the motion or change in a player object (player character) (for example, 47A–47Z in an embodiment of FIG. 1, hereinafter stated) because they differ in function depending upon the nature of the game played. Meanwhile, if all the switch functions are not remembered, the player may encounter difficulty in proceeding to a more advanced scene or stage. The player, if he is not accustomed to the manipulations, may give up the game before experiencing any enjoyment.

Further, the player in most cases cannot understand as to which switch should be operated for what scene and in what manner, by merely reading the explanations about the manipulating method. He cannot grasp the proper time to operate the switch, resulting in difficulty in proceeding to advanced amusing scenes or stages. Thus, there may be cases that the feeling of realism or achievement involved in the game is not perceived by the player. Such a problem similarly arises in the case that the switch functions are displayed on a game screen when choosing the operational mode.

In particular, where a game requires quickness such as in an action game, a shooting game and a race game, and so on, or it represents image pictures in a stereoscopic manner by way of three-dimensional images, it is an emphasized factor which switch should be operated at what time to experience a feeling of achievement or satisfaction in the game or to advance in the game to subsequent scenes.

SUMMARY OF THE INVENTION

Therefore, it is a primary object of this invention to provide a novel video game system and video game memory medium.

It is another object of this invention to provide a video game system and video game memory medium which is capable of generating a feeling of realism in a video game, fulfilling a player's feeling of accomplishment, and enhancing a player's interests for the video game.

It is a further object of this invention to provide a video game system and video game memory medium which facilitates the player's ability to proceed to advanced scenes even where complicated manipulations are required by a game.

It is a still another object of this invention to provide a video game system or game processing memory medium which is adapted to output an appropriate operating way at proper timing in conformity to a surrounding environment (e.g. location, obstacle kind, enemy object kind, etc.) where a player object operated by the player is standing or a situation where the player object resides so that, even if a game requires complicated or difficult operations, the player can easily advance to a forward scene, thereby enhancing game amusement and fulfilling a player's satisfaction or feeling of achievement.

It is another object of the present invention to provide a video game system or game processing memory medium which is adapted to supply player-assisting items or advice at proper timing in accordance with a surrounding environment (e. g. location, obstacle kind, enemy object kind, etc.) where a player object operated by a player is standing or a situation where the player object resides, so that the player can easily advance to a forward scene, thereby further enhancing game amusement and fulfilling player's feeling of achievement.

A video game system according to this invention has an operating means to be operated by a player, and a video game machine to be used in connection with a display device for displaying image data and outputting sounds to output image data for changing display images, based on a program, in response to operation of the operating means, wherein the operating means includes a direction instructing means for instructing a moving direction of a player object that is varied in movement on a screen by operation of the player, and a plurality of motion instructing switches for instructing a movement of the player object, the video game system comprising: a player object image data generating means for generating data for image-displaying the player object; an influencing object image data generating means for generating image data to display an influencing object image that is displayed around an advancing direction of the player object to assume variation determined by the program in respective of operation by the player to have an effect on the player object; a message data generating means for outputting a message on an operating way of the operating means determined for an appropriate operation in relation to the variation in the influencing object, when the player object approaches a position where the player object can advance and the influencing object is to be displayed; and an output control means for combining between the player object image data generating from the player object image data generating means and the influencing object image data generated from the influencing object image data generating means to give an output supplied to the display device whereby the player object and the influencing object are displayed on the screen of the display device and the message on the operating way given by the message data generating means is outputted to the display device.

A video game memory medium according to this invention, comprises: a player object image data generating program for generating data for image-displaying the player object; an influencing object image data generating means for generating image data for displaying an influencing object image that is displayed around an advancing direction of the player object to assume variation determined by a program in a manner irrespective of operation of the player to have an effect upon the player object; a message data generating program for outputting a message on an operating way of the operating means determined for a proper operation in relation to the variation of the influencing object, when the player object approaches to a position where the player object can advance and the influencing object is to be displayed; an output program for combining the player object image data with the influencing object image data to supply to the display device based on the player object image data generating program and the influencing object image data generating program, and outputting the message on the operating way to the display device based on the message data generating program.

The video game machine (10) includes a CPU (11) and an RCP (Reality Co-Processor; 12) to process player object image data, influencing object image data, and other image data that are generated from a memory medium, e.g. an external ROM, so that these CPU and RCP constitute an output control means. The memory medium, such as an external ROM (21), stores player object image data and influencing object image data so that these image data can be read out of the memory medium and stored in an internal memory, e.g. a RAM. The RCP processes these image data to combine the player object and the influencing object image, for display on the display device. The message data is also read out of the ROM and stored in the RAM. The message data is read to the RAM, and displayed together with the image data on the display device by the RCP. Therefore, it is satisfactory for the player to manipulate the controller in compliance with a message displayed.

According to this invention, a video system and videogame memory medium is provided that can enhance a feeling of realism in a video game, fulfill a player's feeling of achievement, and enhance a player's interest in the video game.

Also, according to this invention, since how to manipulate information is displayed as a message, the player can easily advance to more advanced scenes even in a game requiring complicated operations. Further, an appropriate way of operating is output at proper timing in conformity to a surrounding environment (e.g. location, obstacle kind, enemy object kind, etc.) where a player object being operated by the player is standing or a situation where the player object resides. Accordingly, even if a game requires complicated or difficult operations, the player can easily advance to a forward scene, thereby enhancing game amusement and fulfilling a player's satisfaction or feeling achievement.

In one aspect of this invention, the message data generating means generates a message to indicate the kind and the number of operating times of an appropriate switch to be operated among the switches included in the operating means.

The message may be by means of sound. That is, the message data generating means generates a message in a character-data form, or produces sound data. The sound data is output from a sound circuit.

In another aspect of this invention, an assisting data generating means for generating assisting data for helping the player object when the player object comes to a predetermined relation to a displaying position of the influencing object at a position to which the player object can advance. This assisting data is displayed, together with the player object and the influencing object, on the display device by the output control means. The assisting data generating means outputs a message, that is effective for the player object to combat with the enemy object, in at least one communication form such as characters or sounds.

In this aspect, a player-assisting item is offered at proper timing in conformity to a surrounding environment (e.g. location, obstacle kind, enemy object kind, etc.) where a player object operated by the player is standing or a situation where the player object resides. Accordingly, even if there is an operational mistake during a game, it is possible to continue the game. The player is assisted, and he can easily advance to a forward scene, thereby enhancing further game amusement and fulfilling a player's feeling of achievement.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram showing a course choosing screen in a game shown in FIG. 10;

FIG. 13 is a view showing one example of an on-screen display having a message output represented based on the communication process with the fellows in the FIG. 11 game;

FIG. 14 is a view showing one example of an on-screen display in a state combating against a boss character in the FIG. 11 game;

FIG. 15 is a main flowchart of a game process of one embodiment of the present invention;

DETAILED DESCRIPTION OF THE PREFERRED EMBODIMENT

Now, an explanation is made of a video game system of the present invention and a video game memory medium used therefor. Although in the below exemplary embodiments explanations will be in the form of a particular video game machine, an image processing apparatus such as a personal computer or the like, can also be applied in accordance with the present invention as another example. Although an operating means is explained in the form of of a particular game controller, an input device such as a keyboard, or a mouse may be employed provided that the video game system of the invention is applied to an image processing apparatus such as a personal computer.

Figure 1:
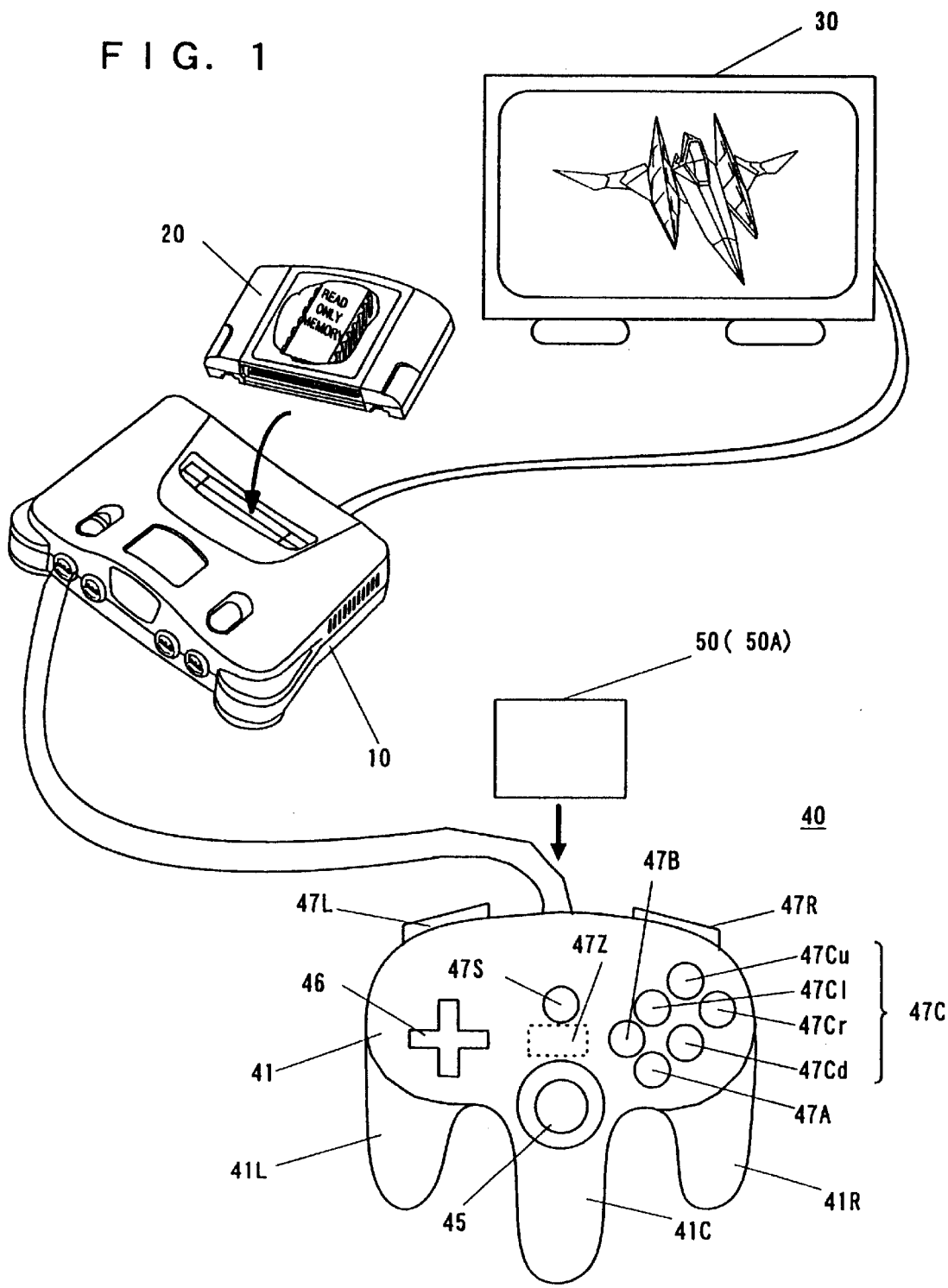
FIG. 1 is an external view showing a structure of a video game system of one embodiment of the present invention.

FIG. 1 is an external view showing a structure of an exemplary video game system according to an embodiment of the present invention. The video game system is structured by including a video game machine main body 10, a ROM cartridge 20 as an example of an external memory device, a CRT display 30 as an example of a display device connected to the video game machine main body 10, and a controller 40 as an example of an operating means (or an operating input means). The controller 40 is detachably mounted, as required, with a RAM cartridge 50 (or a vibration cartridge 50A).

The controller 40 includes a plurality of switches or buttons on a housing 41 that is in a form graspable by respective hands or one hand. Specifically, the controller 40 is provided with handles 41L, 41C, 41R at lower portions on the respective left, right and center of the housing 41, thus providing an operating area at an upper surface thereof. In the operating area, there are provided an analog-input joystick 45 at a central lower portion thereof, a cross-shaped digital direction switch (hereinafter called "cross switch") 46 on the left side, and a plurality of button switches 47A–47Z on the right side. The joystick 45 is used to designate or input a moving direction and/or moving speed (or the moving amount) of the player object based on the amount and direction of joystick inclination. The cross switch 46 is used to input to designate a player object moving direction, in place of the joystick 45. The plurality of button switches 47 include switches 47A, 47B for designating the motion of the player object, a switch 47C for use to change an observer's image eye or point of view perspective as viewed through a camera, a start switch 47S, a motion switch 47L provided on a lateral surface of a left upper portion of the housing 41, a motion switch 47R provided on a lateral surface of a right upper portion of the housing 41, and a switch 47Z provided on a backside of the handle 41C. The switch 47C is comprised of four button switches 47Cu, 47Cd, 47Cl, 47Cr arranged at the upper, lower, left and right so that it can be used, in also an application other than changing the observer's camera eye perspective, to control the moving speed (e.g. acceleration, deceleration, etc.) in a shooting or action game. These button switches 47A–47Z can have functions as defined by a game program.

Figure 2:
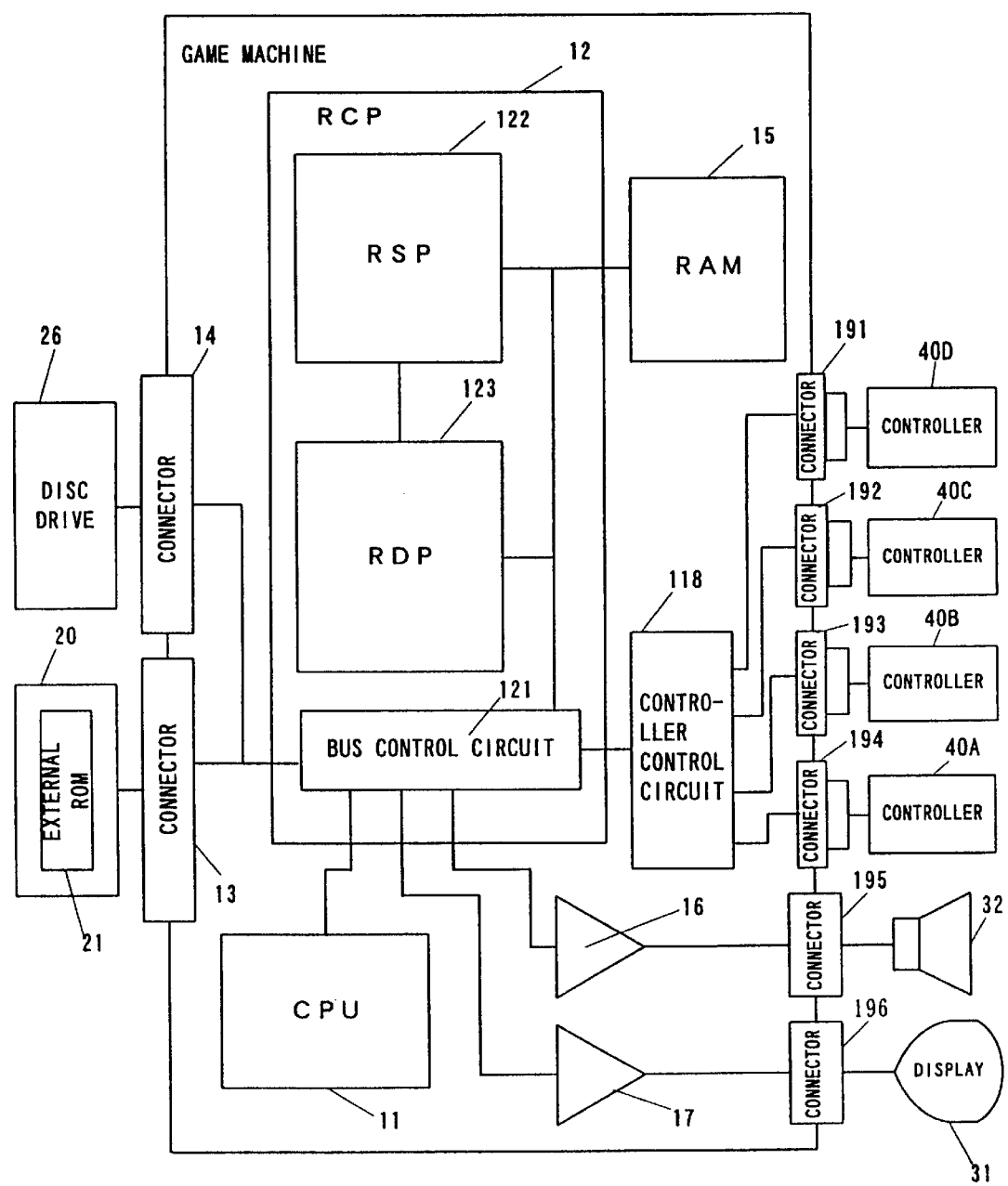
FIG. 2 is a block diagram of the video game system of the one embodiment of the present invention.

FIG. 2 is a block diagram of the video game system of one exemplary hardware embodiment of the present invention. The video game machine 10 incorporates therein a central processor unit (hereinafter abbreviated as "CPU") 11 and coprocessor (reality coprocessor: hereinafter abbreviated as "RCP") 12. The RCP 12 includes a bus control circuit 121 for controlling buses, an image processing unit (reality signal processor; hereinafter abbreviated as "RSP") 122 for performing polygon coordinate transformation, shading treatment and so on, an image processing unit (reality display processor; hereinafter abbreviated as "RDP") 123 for rasterizing polygon data into an image to be displayed and converting the same into a data form (dot data) memorable on a frame memory. The RCP 12 is connected with a cartridge connector 13 for detachably mounting with a ROM cartridge 20, a disc-drive connector 14 for detachably mounting with a disc drive 26, and a RAM 15. Also, the RCP 12 is connected with an audio signal generating circuit 16 for outputting a sound signal processed by the CPU 11, and an image signal generating circuit 17 for outputting an image signal. Further, the RCP 12 is connected with a controller control circuit 18 for serially transferring operational data for one or a plurality of controllers 40A–40D and/or data for a RAM cartridge 50 for extension.

The bus control circuit 121 included in the RCP 12 parallel-serial converts the command supplied in a parallel signal from the CPU 11 via a bus so as to supply as a serial signal to the controller control circuit 18. Also, the bus control circuit 121 converts the serial signal inputted from the controller control circuit 18 into a parallel signal to give an output to the CPU 11 via a bus. The data representing an operational state read out of the controller 40A–40D is processed by the CPU 11, and temporarily stored within a RAM 15, and so on. In other words, the RAM 15 includes a storage area for temporarily memorizing the data to be processed by the CPU 11 so that it is utilized for smoothly reading and writing data through the bus control circuit 121.

The sound signal generating circuit 16 is connected with a connector 195 that is provided at a rear face of the video game machine 10. The image signal generating circuit 17 is connected with a connector 196 provided at the rear face of the video game machine 10. The connector 195 is disconnectably connected with a connecting portion of a sound generating device 32 such as a TV speaker, etc. The connector 196 is disconnectably connected with a connecting portion of a display 31 such as a TV receiver or CRT.

The controller control circuit 18 is connected with controller connectors (hereinafter abbreviated as "connectors") 191–194 that are provided at the front face of the video game machine 10. The connectors 191–194 are detachably connected with a controller 40A–40D through a connecting jack. The connection of a controller 40A–40D to a connector 191–194 in this manner places the controllers 40A–40D into electrical connection to the video game machine 10, thereby enabling transmission/reception or transfer of data therebetween.

Figure 3:
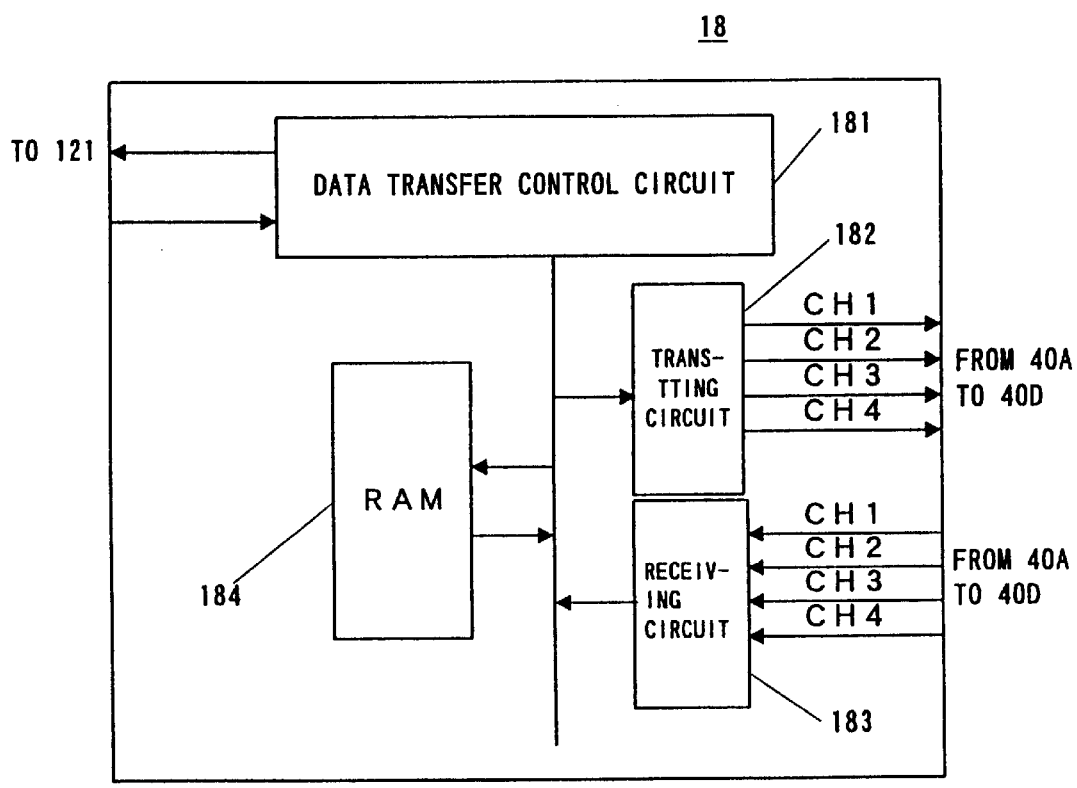
FIG. 3 is a detailed circuit diagram of a controller control circuit 18.

FIG. 3 is a detailed circuit diagram of the controller control circuit 18. The controller control circuit 18 is used for transmitting and receiving data in serial between the RCP 12 and the controller connectors 191–194. The controller control circuit 18 includes a data transfer control circuit 181, a transmitting circuit 182, a receiving circuit 183, and a RAM 184 for temporarily memorizing transmission or reception data. The data transfer control circuit 181 includes a parallel-serial converting circuit and a serial-parallel converting circuit to convert a data format during data transfer, and further performs control to write into and read from the RAM 184. The serial-parallel converting circuit converts the serial data supplied from the RCP 12 into parallel data to supply it to the RAM 184 or the transmitting circuit 182. The parallel-serial converting circuit converts the parallel data supplied from the RAM 184 or the receiving circuit 183 into serial data to supply it to the RCP 12. The transmitting circuit 182 converts the command for controlling controller-40 signal reading supplied from the data transfer control circuit 181 and the writing data (parallel data) to the RAM cartridge, into serial data to be delivered to channels CH1–CH4 respectively corresponding to the controllers 40A–40D. The receiving circuit 183 receives, in serial data, the operational state data of the controllers 40A–40D inputted through the corresponding channels CH1–CH4 and read-out data from the RAM cartridge 50 to convert them into parallel data to be delivered to the data transfer control circuit 181. The data transfer control circuit 181 serves to control writing into the RAM 184 on the data transferred from the RCP 12, the operational state data of the controller 40A–40D received by the receiving circuit 183, or the data read out of the RAM cartridge 50, and reads data out of the RAM 184 based on a command from the RCP 12 so as to transfer it to the RCP 12.

The RAM 184, though not shown, includes memory areas 184a–184h. The area 184a is stored with a command for the first channel, while the area 184b is stored with transmission and reception data for the first channel. Similarly, the area 184c is stored with a command for the second channel, while the area 184d is stored with transmission and reception data for the second channel. The area 184e is stored with a command for the third channel, while the area 184f is stored with transmission and reception data for the third channel. The area 184g is stored with a command for the fourth channel, while the area 184h is stored with transmission and reception data for the fourth channel.

Figure 4:
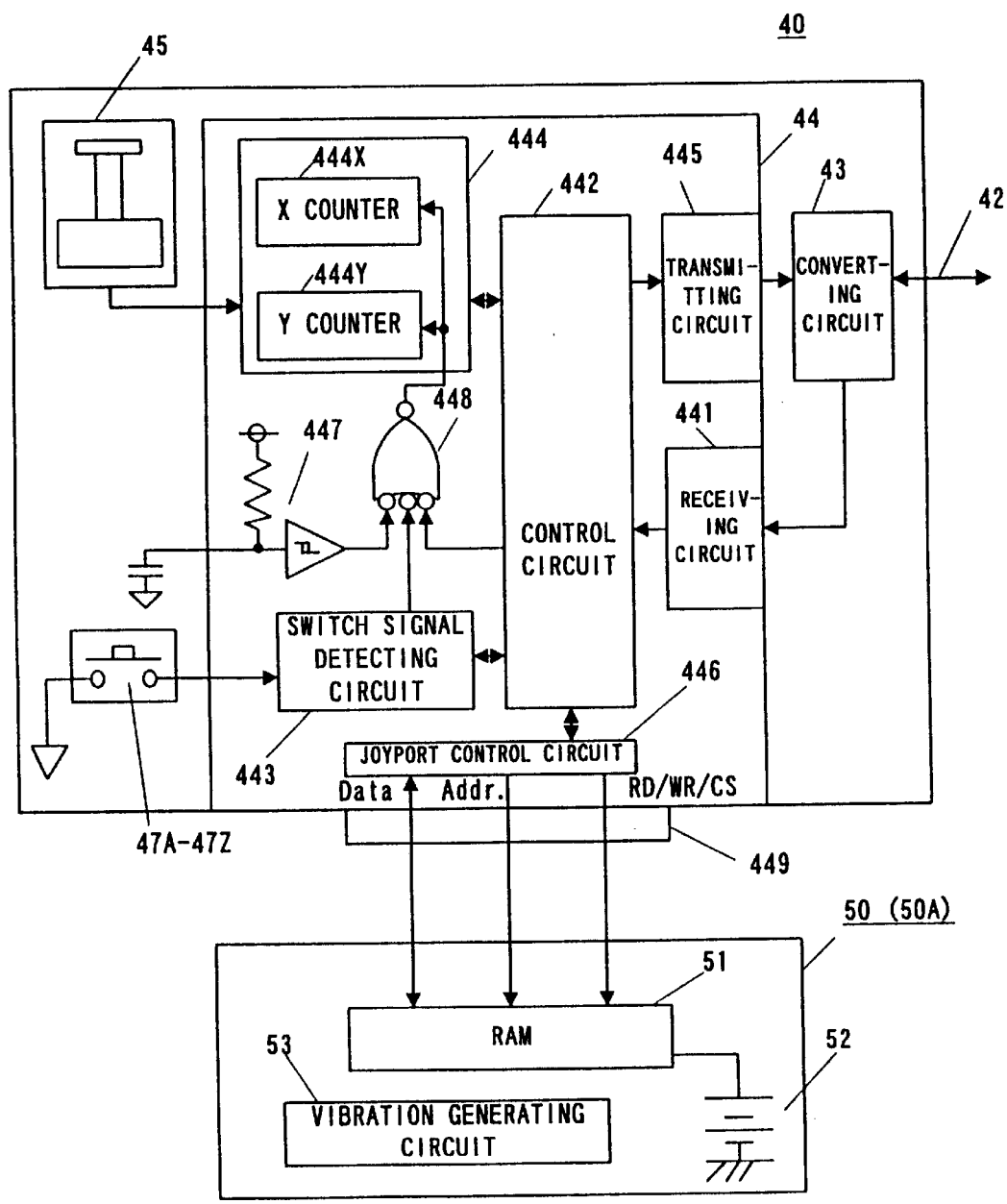
FIG. 4 is a block diagram of a controller 40.

FIG. 4 is a detailed circuit diagram of the controller 40 and the RAM cartridge 50. The housing of the controller 40 incorporates an operating signal processing circuit 44, etc. in order to detect an operational state of the joystick 45, switches 46, 47, etc. to transfer the detected data to the controller control circuit 18. The operating signal processing circuit 44 includes a receiving circuit 441, a control circuit 442, a switch signal detecting circuit 443, a counter circuit 444, a joyport control circuit 446, a reset circuit 447 and a NOR gate 448. The receiving circuit 441 converts a serial signal, such as a control signal transmitted from the controller control circuit 18 or writing data to the RAM cartridge 50, into a parallel signal to supply it to the control circuit 442. The control circuit 442 generates a reset signal to reset (0), through the NOR gate 448, count values of an x-axis counter 444X and a y-axis counter 444Y within the counter 444, when the control signal transmitted from the controller control circuit 18 is a signal for resetting X, Y coordinates of the joystick 45.

The joystick 45 includes X-axis and Y-axis photo-interrupters in order to resolve a lever inclination into X-axis and Y-axis components to generate pulses in number proportional to the inclination so that it supplies pulse signals respectively to the counter 444X and the counter 444Y. The counter 444X counts the number of pulses generated in response to the inclination amount when the joystick 45 is inclined in the X-axis direction. The counter 444Y counts the number of pulses generated responsive to the inclination amount when the joystick 45 is inclined in the Y-axis direction. Accordingly, the resultant X-axis and Y-axis vector that is determined by the count values of the counters 444X and 444Y serves to determine a moving direction and a coordinate position of the player object or hero character or a cursor. Incidentally, the counter 444X and the counter 444Y are also reset of their values when a reset signal is supplied from the reset signal generating circuit 447 due to turning on the power or a reset signal is supplied from the switch signal detecting circuit 443 due to simultaneous depressing of predetermined two switches.

The switch signal detecting circuit 443 responds to an output command of a switch state supplied on a constant period (e.g. a TV frame period of a 1/30 second interval) from the control circuit 442, to read a signal varying depending upon a depression state of the cross switch 46 and the switches 47A–47Z, then delivering it to the control circuit 442. The control circuit 442 responds to a read-out command signal of the operational state data from the controller control circuit 18 to supply a predetermined data format of the operational state data on the switches 47A–47Z and the count values of the counters 444X, 444Y to the transmitting circuit 445. The transmitting circuit 445 converts the parallel signal outputted from the control circuit 442 into a serial signal, and transfer it to the controller control circuit 18 via a converting circuit 43 and a signal line 42. The control circuit 442 is connected with a port control circuit 446 via an address bus and a data bus as well as a port connector 449. The port control circuit 446 performs data input/output (or transmission/reception) control according to a command from the CPU 11, when the RAM cartridge 50 is connected to the port connector 449.

The RAM cartridge 50 is structured by connecting the RAM 51 to the address bus and data bus and connecting the RAM 51 with a battery 52. The RAM 51 is a RAM having a capacity of lower than a half of a maximum memory capacity accessible through the address bus (e. g. 256 k bits). The RAM 51 is to store with backup data in relation to a game, and it keeps backup data by being supplied with electric power from the battery 52 even if the RAM cartridge 50 is withdrawn from the port connector 449.

Incidentally, where representing an impact state with collisions, blasts and so on through images or sound outputting in a highly realistic manner, it is possible to use a RAM cartridge 50 incorporating a vibration generating circuit 53 or a vibration cartridge 50A comprising a vibration generating circuit 52 without RAM 51.

The ROM cartridge 20 is structured by an external ROM 21 mounted on a circuit board so as to accommodate the circuit board within a housing thereof. The external ROM 21 is stored with image data or program data to be image-processed for a game or the like, and sound data such as of music, effect sounds or messages, as required.

Figure 5:
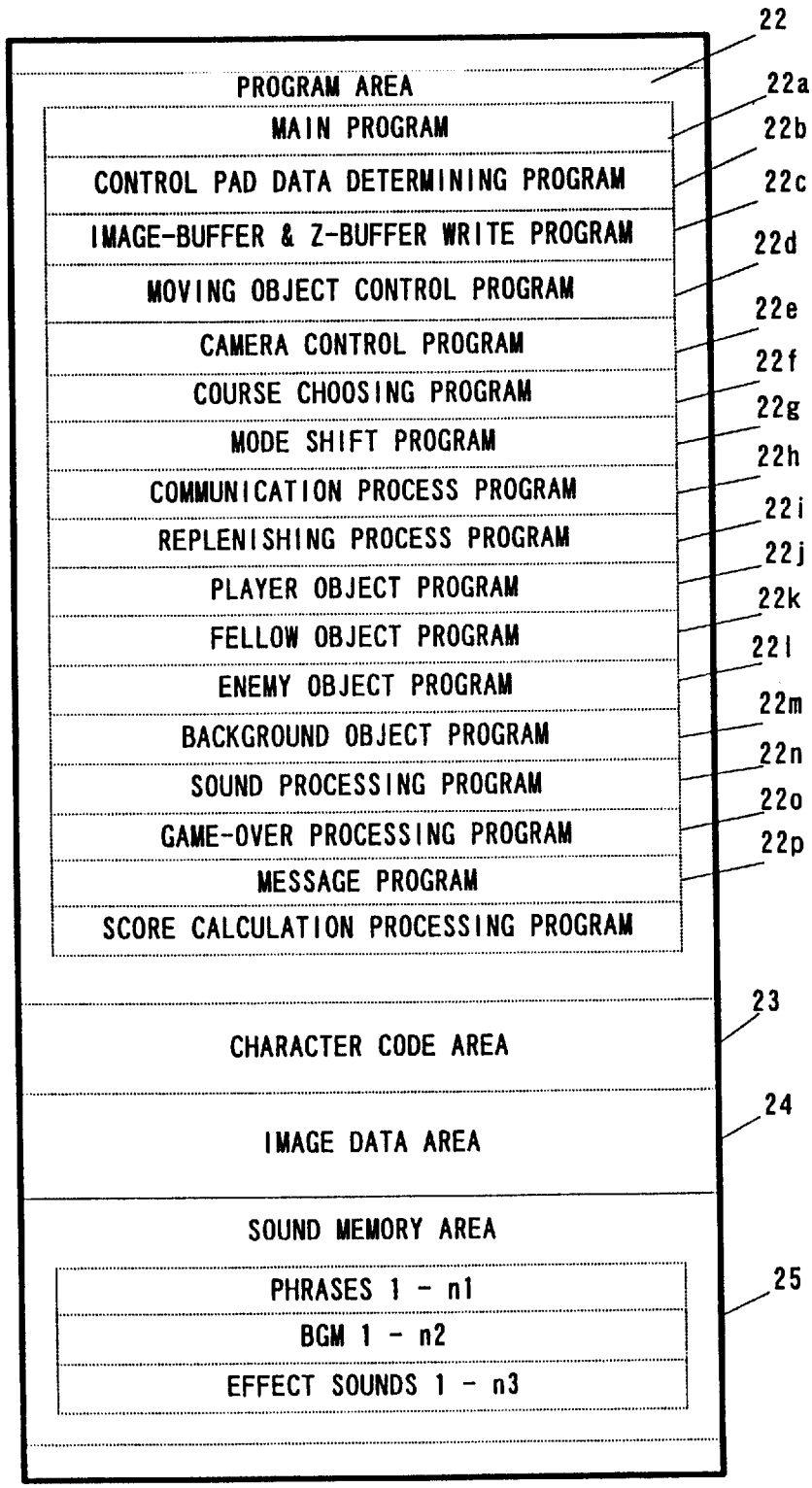
FIG. 5 is a memory map illustratively showing an entire memory space of an external ROM 21.
Figure 6:
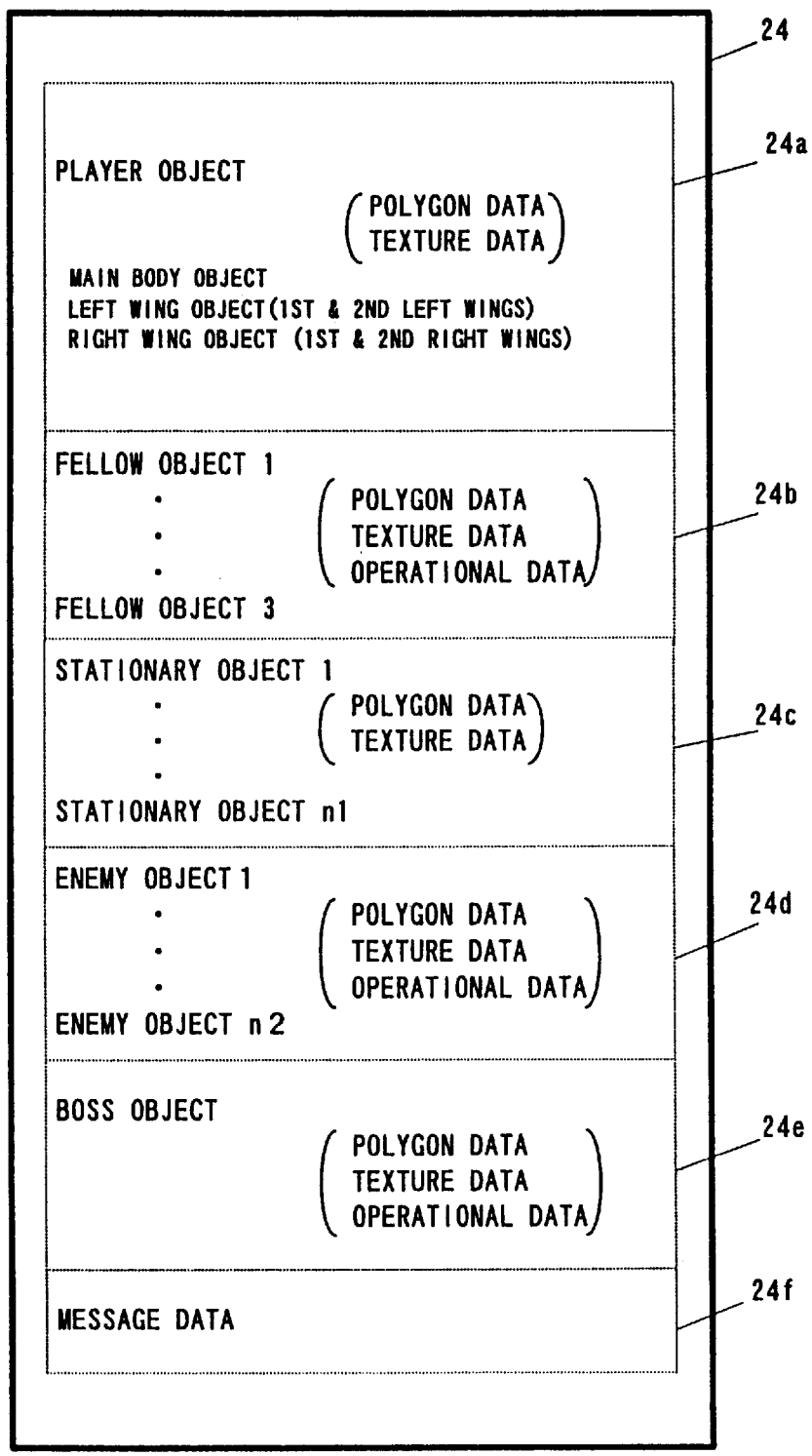
FIG. 6 is a memory map showing in detail part of the memory space of the external ROM 21.

FIG. 5 is a memory map illustratively representing the entire memory space of the external ROM 21, while FIG. 6 is a memory map showing in detail part (image display data area 24) of the memory space of the external ROM 21. The external ROM 21 includes a plurality of memory areas (hereinafter the "memory area" is abbreviated as "area" when it is used with a data kind name put in front thereof), for example as shown in FIG. 5, a program area 22, a character code area 23, an image data area 24 and a sound memory area 25, thus fixedly storing various programs beforehand.

Figure 16:
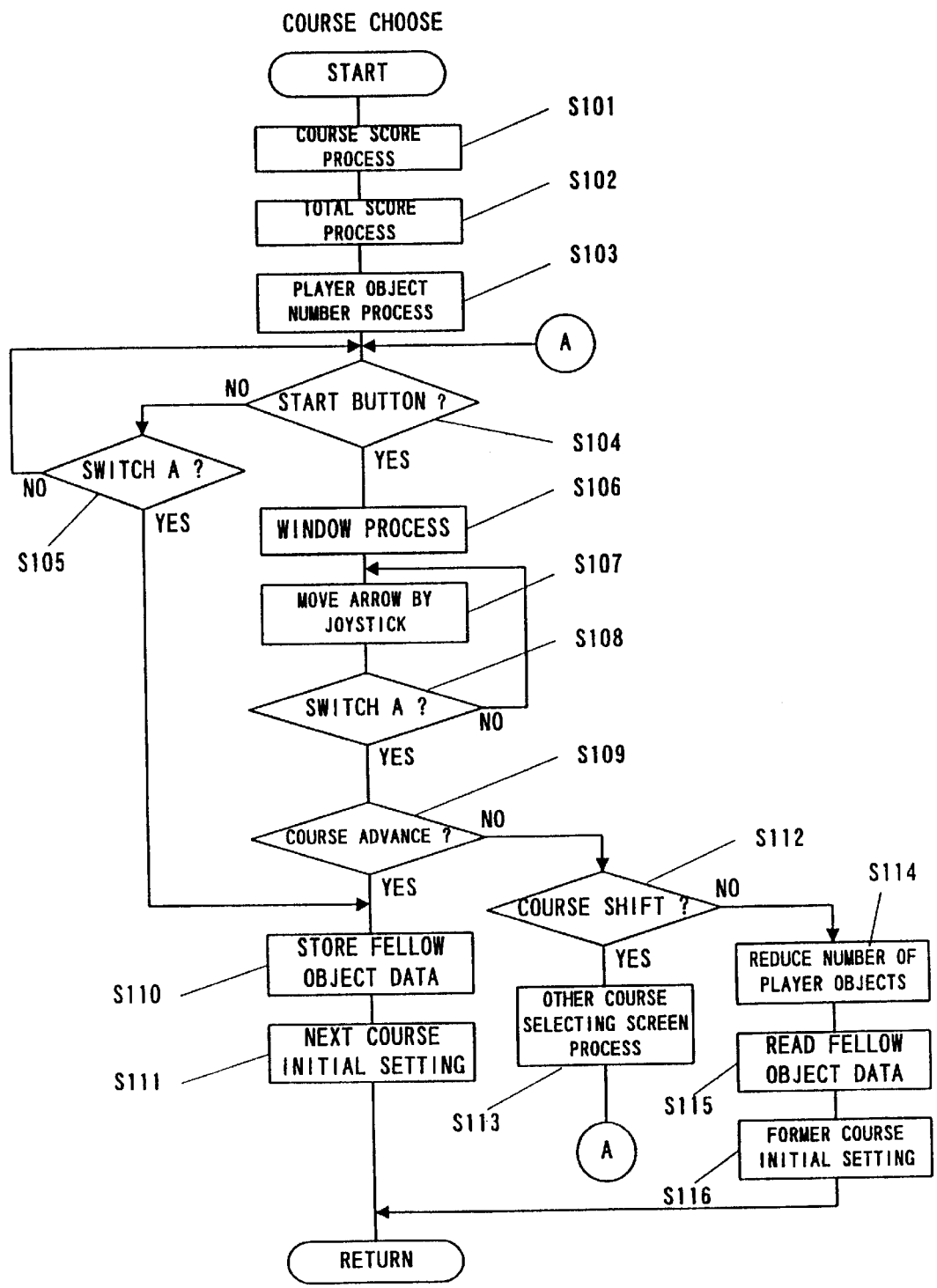
FIG. 16 is a subroutine flowchart showing a detailed process for the course choosing screen.
Figure 17:
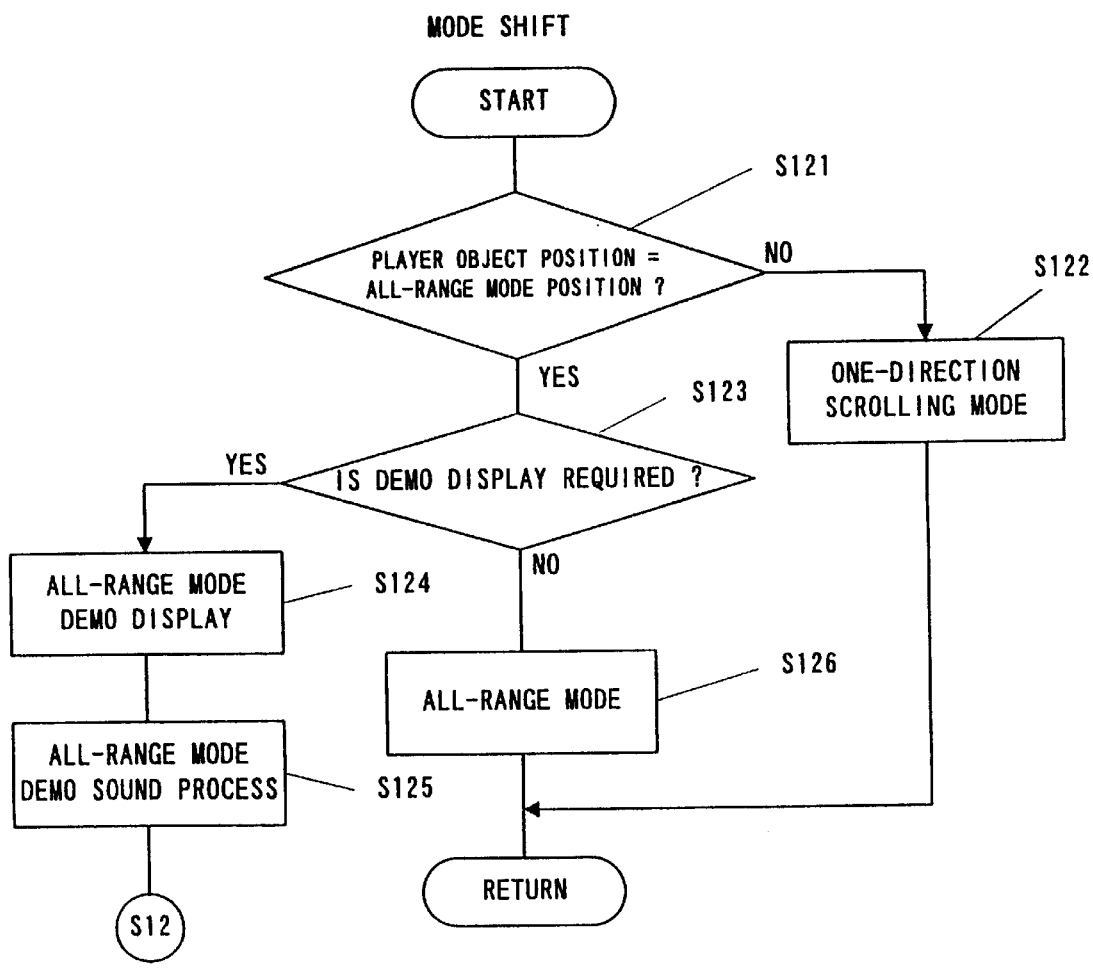
FIG. 17 is a subroutine flowchart showing a detailed process for mode shifting.
Figure 18:
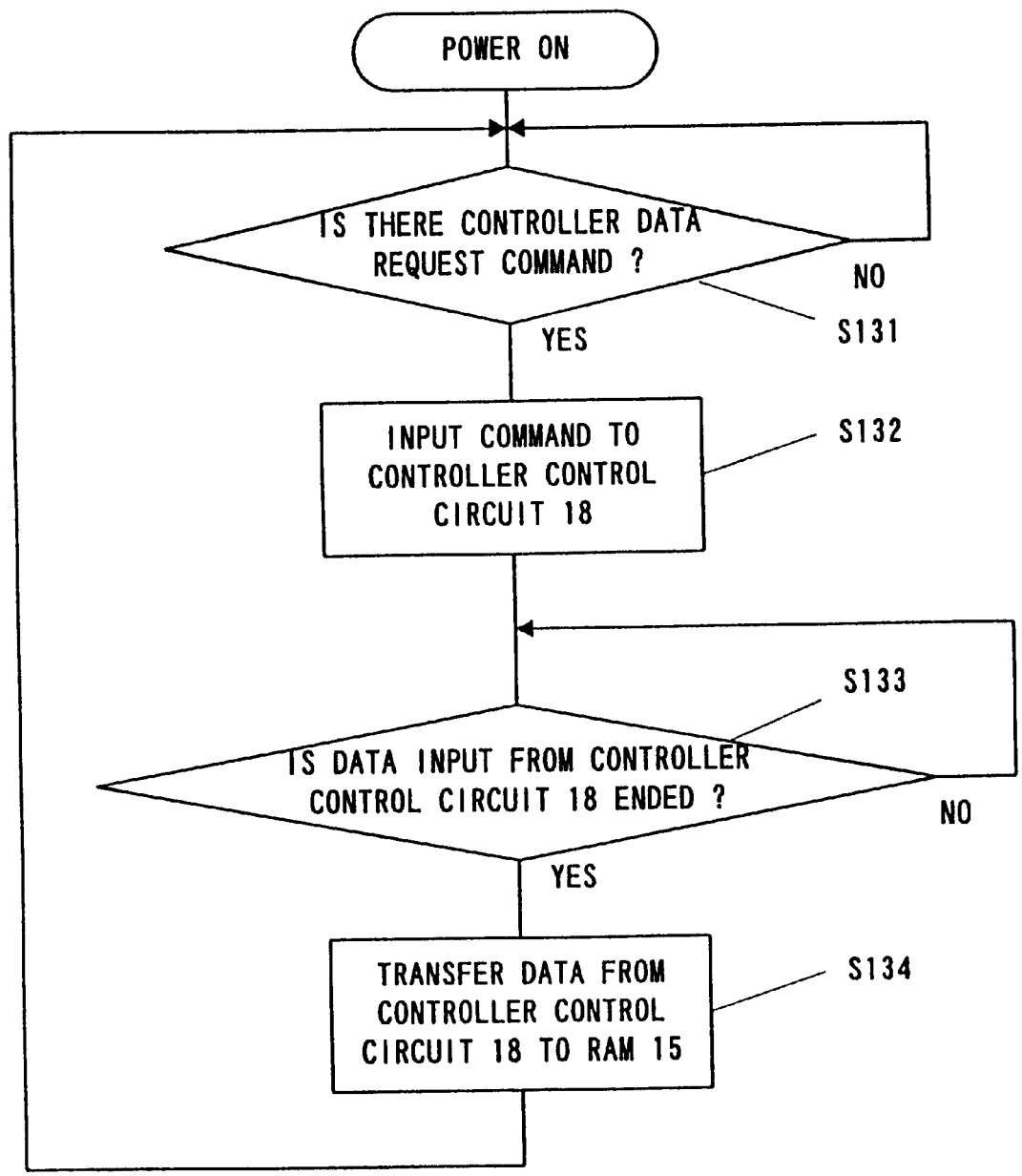
FIG. 18 is a flowchart for explaining data transfer between the controller control circuit 18 and the video game machine main body.

The program area 22 is stored with programs required for performing image processing such as for a game (programs for realizing the functions of flowcharts shown in FIG. 15–FIG. 31 hereinafter stated or game data conforming to a game content, or the like). Specifically, the program area 22 includes memory areas 22a–22p for previously memorizing operating programs for the CPU 11 in a fixed manner. A main program area 22a is stored with a main routine processing program for a game shown in FIG. 15 hereinafter stated, or the like. A control pad data (operating state) determining program area 22b is stored with a program for processing the data representative of an operating state, etc. of the controller 40. A write program area 22c is stored with a write program by which the CPU 11 causes the RCP 12 to write into a frame memory and a Z buffer. For example, the write program area 22c is stored with a program for writing chrominance data, as image data based on texture data for a plurality of movable objects or background objects displayed in one background scene, into a frame memory area (152 shown in FIG. 7) of the RAM 15, and a program for writing depth data into a Z buffer area (153 shown in FIG. 7). A movement program area 22d is stored with a control program by which the CPU 11 causes the RCP 12 to vary the position of the movable object in a three-dimensional space. A camera control program area 22e is stored with a camera control program by which control is made as to which position and direction the movable object including the player object or the background object is photographed in the three-dimensional space. A course choosing program area 22f is stored with a course choosing subroutine program as shown in FIG. 16 to be described later. A mode shift program area 22g is stored with a mode shifting subroutine program as shown in FIG. 17 to be described later. The program stored in the memory area 22g serves to change the direction and range of scroll, by shifting the scroll mode between one-directional scroll display and all-direction (all-range) scrolling.

Figure 19:
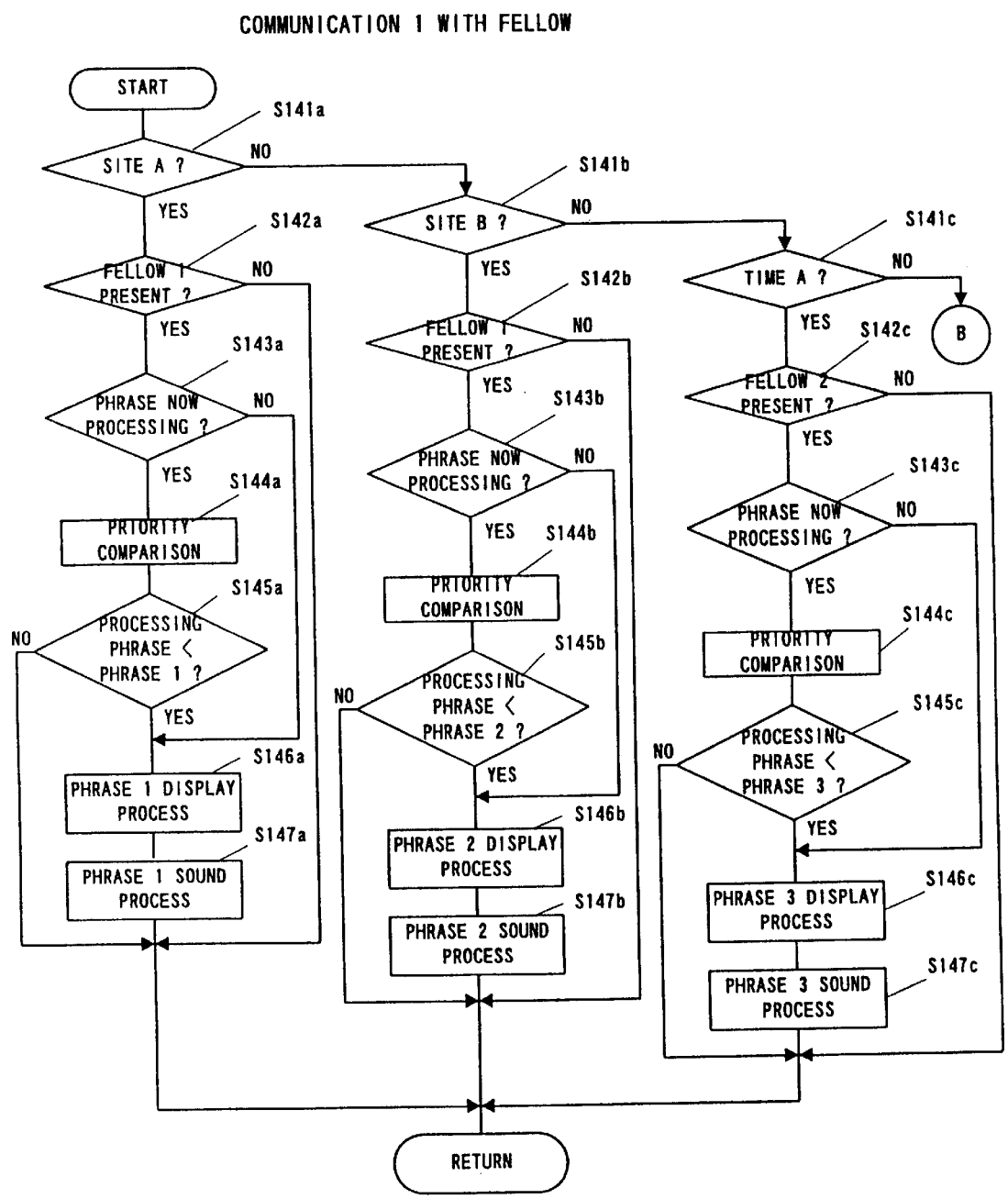
FIG. 19, FIG. 20 and FIG. 21 are a subroutine flowchart for a communication process with the fellow, according to one example of a message output process to assist game advancement.
Figure 20:
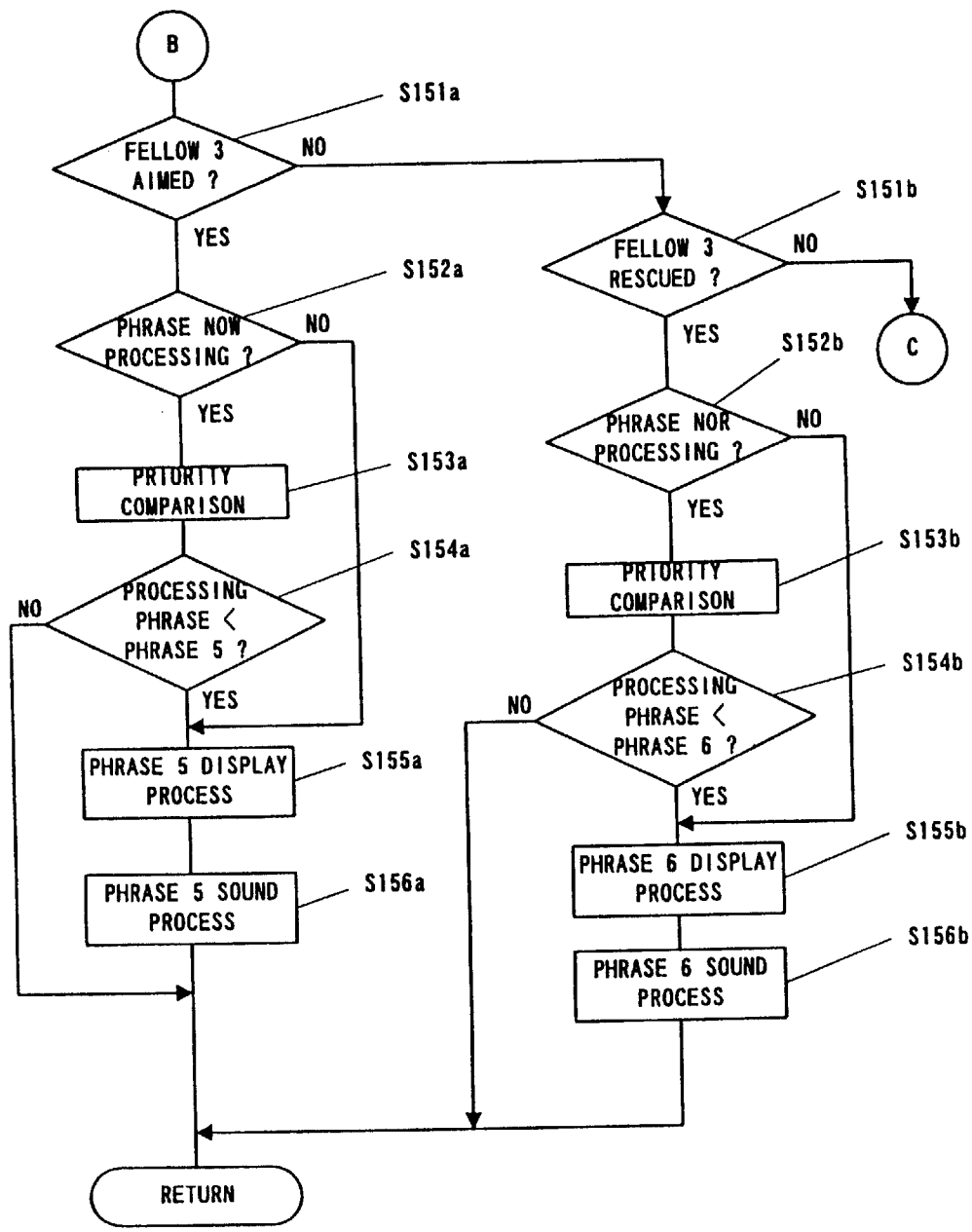
Figure 21:
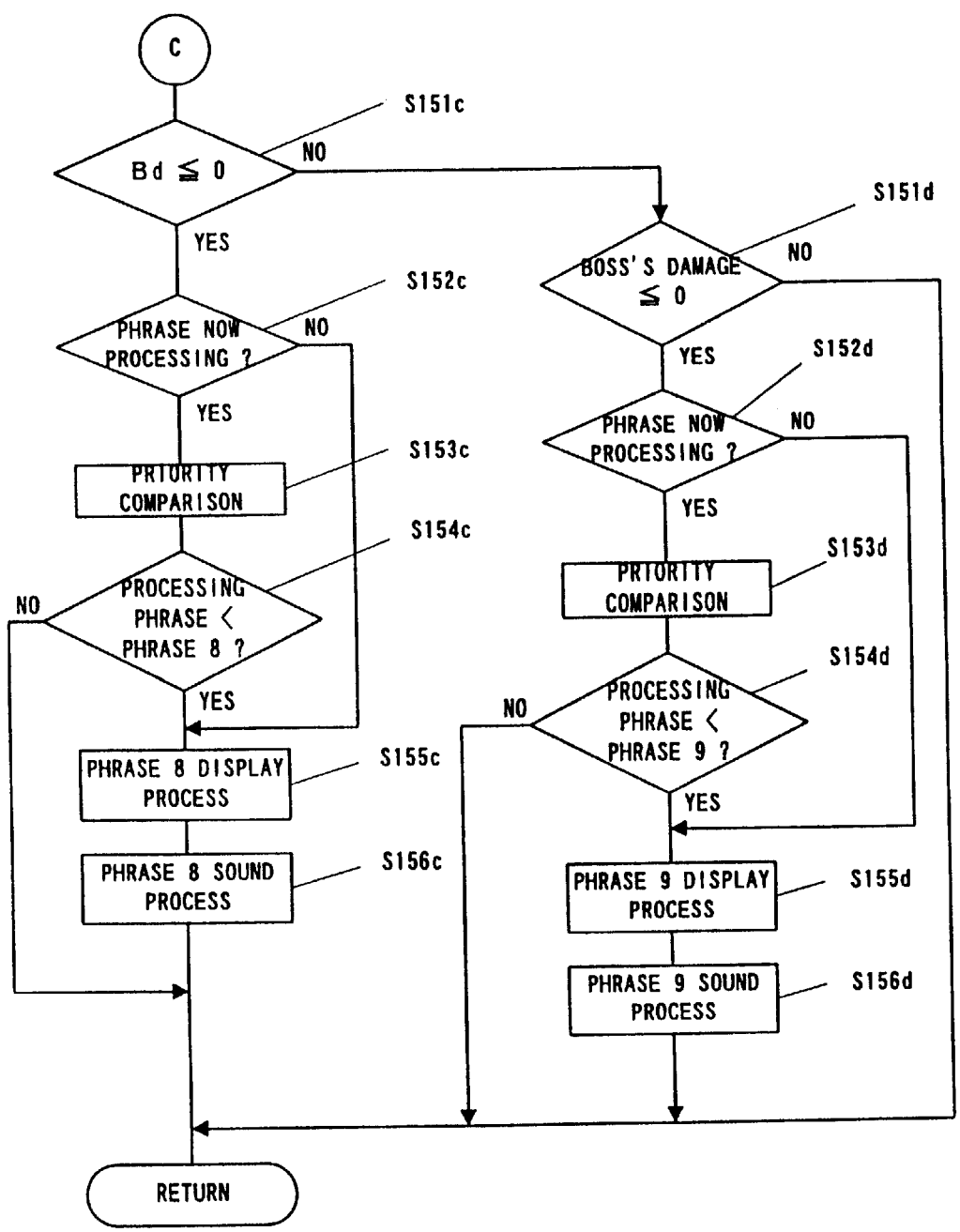
Figure 22:
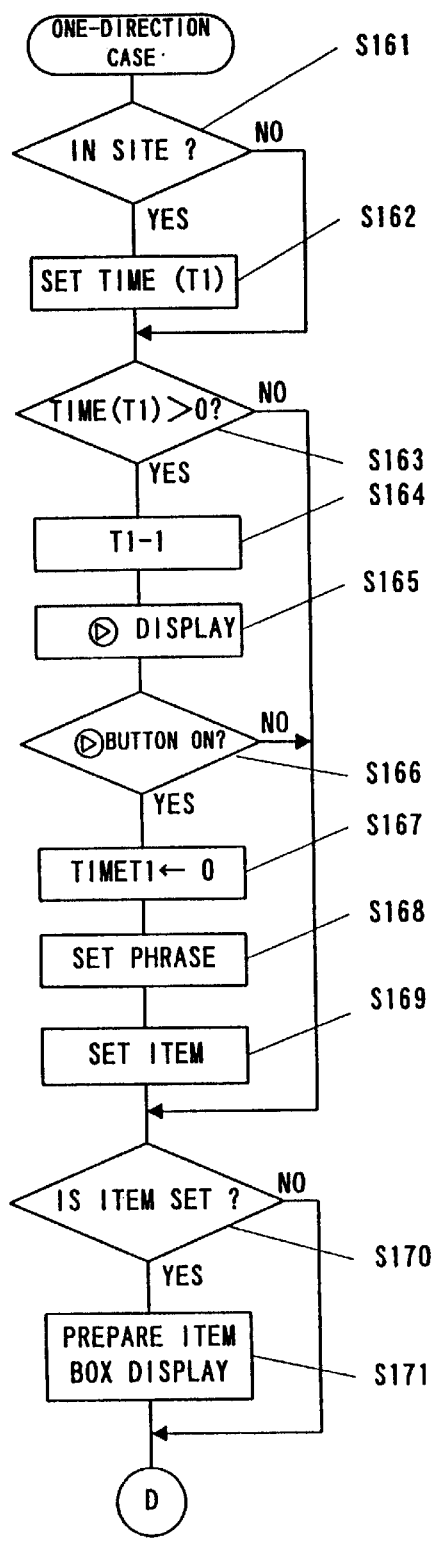
FIG. 22 and FIG. 23 are a subroutine flowchart of a replenishing material supply process according to another example of a message output process to assist game advancement.
Figure 23:
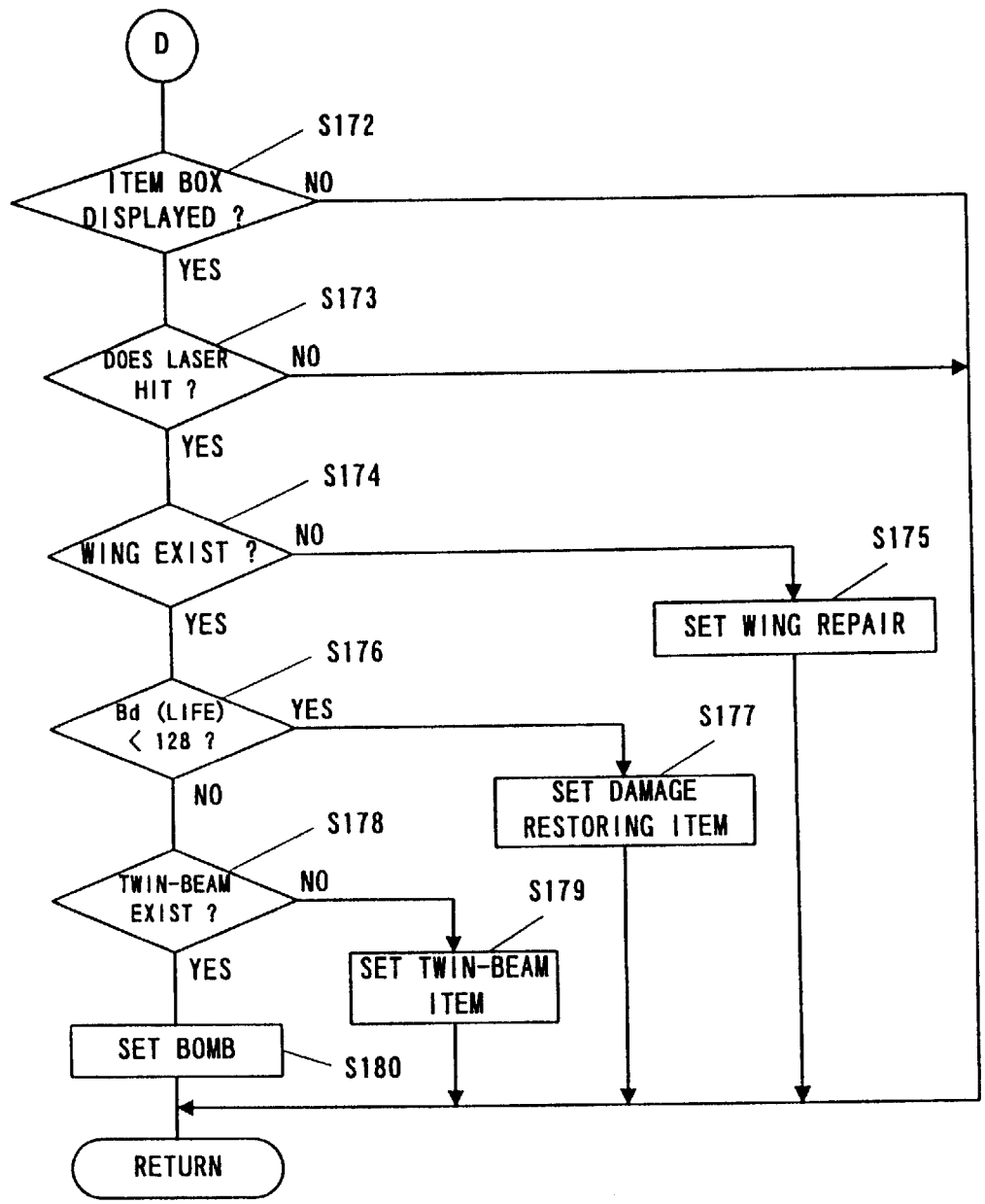

A communication process program area 22h is stored with a communication process subroutine program as shown in FIG. 19–FIG. 21 hereinafter described. A replenishing process program area 21i is stored with a replenishing process subroutine program as shown in FIG. 22–FIG. 23 hereinafter described. A player object program area 22j is stored with a program for display-controlling the object operated by the player. A fellow object program area 22k is stored with a program (see FIG. 24–FIG. 26) for display-controlling a fellow object that proceeds with a game in cooperation with the player object. An enemy object program area 22l is stored with a program (see FIG. 27 and FIG. 28) for display-controlling an enemy object that makes attacking on the player object. A background program area 22m is stored with a background creating program (see FIG. 29) by which the CPU 11 causes the RCP 12 to create a three-dimensional background picture (or course). A sound processing program area 22n is stored with a program (see FIG. 31) for generating a message of an effect sound or a music or voices. A game-over process program area 22o is stored with a program for a process to be carried out when a game is ended, e. g. detecting a state of a game-over or saving backup data on a state of the game so far before the game-over. A message process program area 22p is stored with a subroutine program for processing a message (communication process in FIG. 19–FIG. 21, processes including a supply of replenishment materials in FIG. 22 and FIG. 23), in order to output, by displaying characters or outputting sounds, a message helpful for operation suited for the site or environment where the player object is standing.

A literal code area 23 is an area for memorizing a plurality of kinds of literal codes, which is stored with literal dot data in plurality of kinds corresponding to a code. The literal code data stored in the literal code area 23 is utilized for displaying an explanatory note for the player in the progress of a game. In this embodiment, this area is used to display a literal message (or phrase) concerning an appropriate way of manipulating or method of responding at proper timing in conformity to the surrounding environment that the player object is standing (e. g. site, obstacle kind, enemy object kind) or the situation that the player object is placed in.

Figure 12:
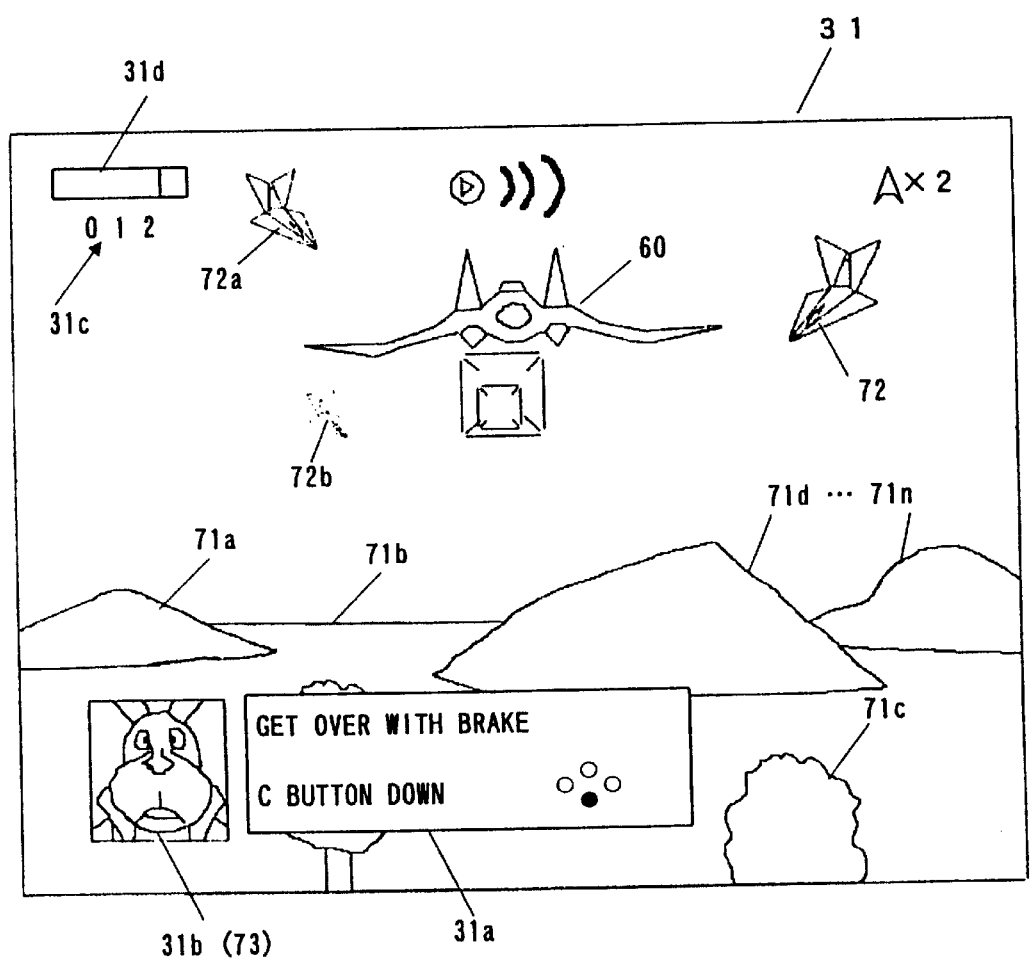
FIG. 12 is a diagram illustratively showing a message output content in a communication process with fellows in the game of FIG. 11.

An image data area 24 includes memory area 24a–24f, as shown in FIG. 6. The image data area 24 is stored with respective coordinate data, texture data, etc. of a plurality of polygons for each of the background objects and/or the movable objects, and a display control program for displaying these objects stationarily at predetermined locations or moving around. For example, the memory area 24a is stored with a program for displaying the player object. The memory area 24b is stored with a fellow object program for displaying a plurality of fellow objects 1–3. The memory area 24c is stored with a background object program for displaying a plurality of background (stationary) objects 1–n1. The memory area 24d is stored with an enemy object program for displaying a plurality of enemy objects 1–n2. The memory area 24e is stored with a boss object program for displaying a boss object. The memory area 24f is stored with data for outputting a phrase or message, for example, as shown in FIG. 12 to be stated later.

A sound memory area 25 is stored with sound data, such as phrases, effect sounds, and game music, for outputting a message as above in sound in a manner appropriate for the scene to cope therewith.

The external memory device may be implemented using other memory mediums such as a CD-ROM and a magnetic disc, in place of the ROM cartridge 20 or in addition to the ROM cartridge 20. In such a case, a disc drive (record reproducing device) 26 is provided in order to read and, if required, write various data (including program data and image display data) from an optical or magnetic disc-type memory medium, such as a CD-ROM or a magnetic disc. The disc drive 26 reads data out of a magnetic or optical disc that magnetically or optically memorizes program data similar to that of the ROM 21, to transfer the data to the RAM 15.

Figure 7:
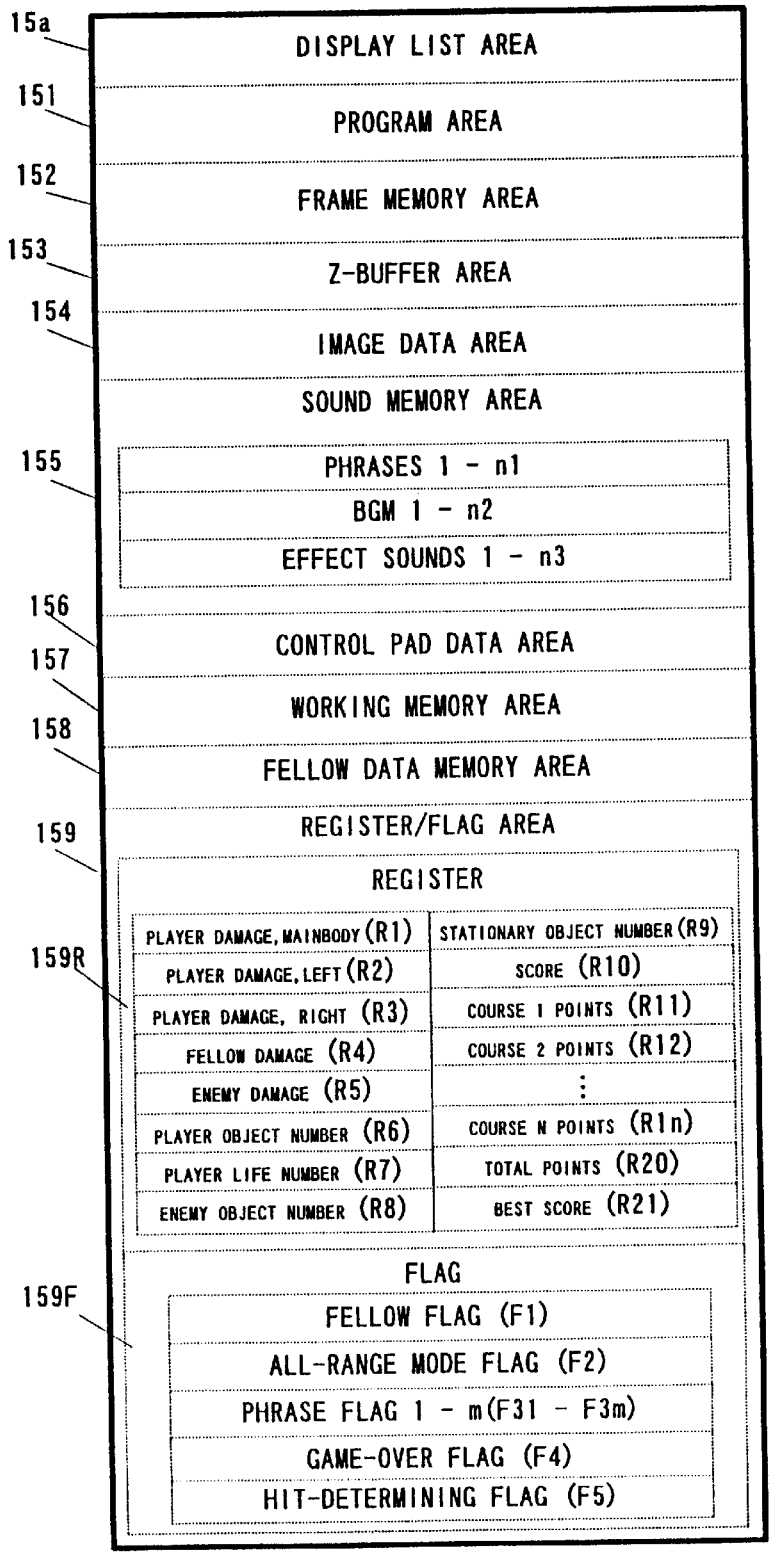
FIG. 7 is a memory map illustratively showing the entire memory space of the RAM 15.
Figure 8:
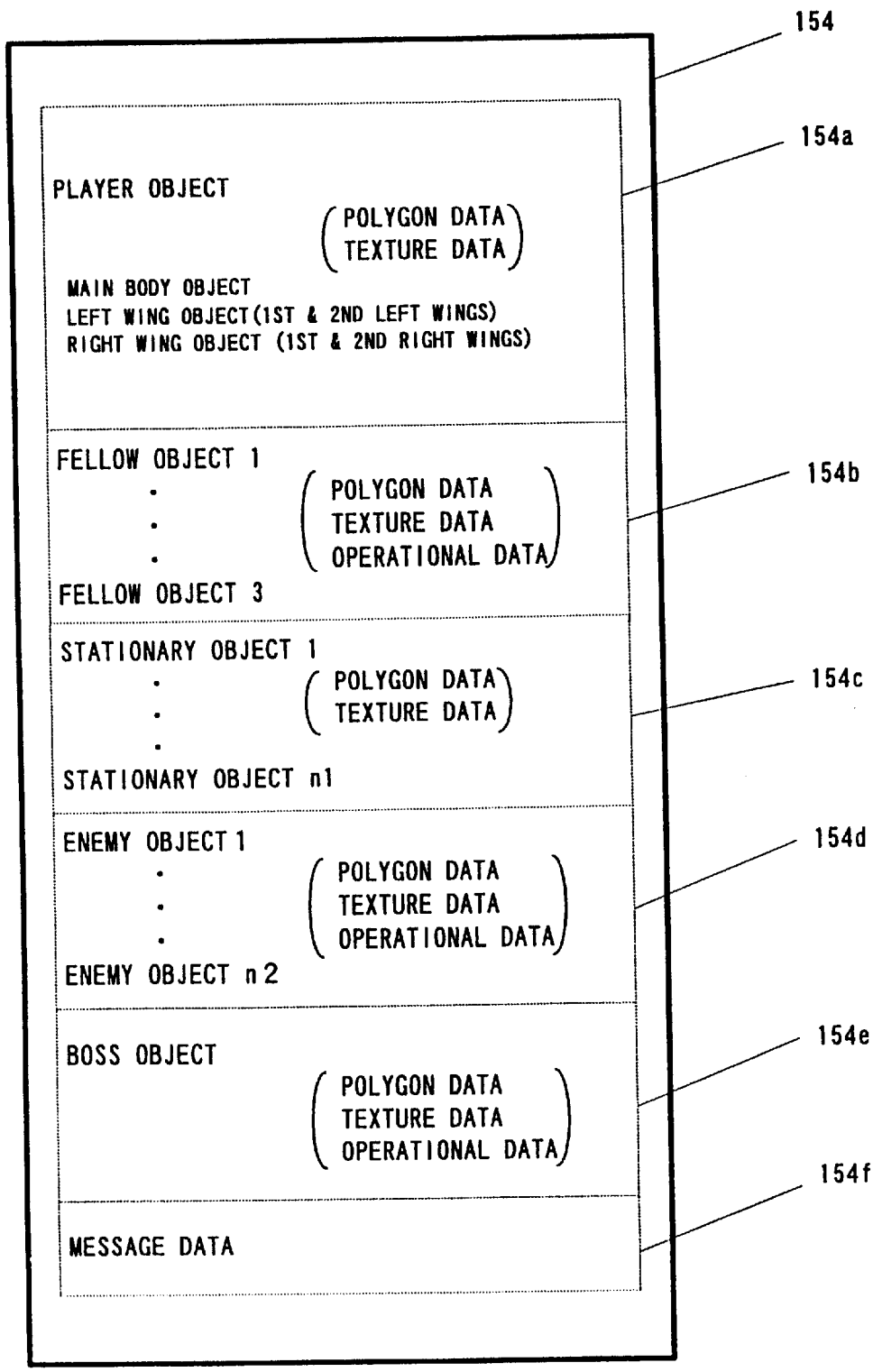
FIG. 8 is a memory map showing in detail part of the memory space of the RAM 15.

FIG. 7 is a memory map illustratively showing an entire memory space of the RAM 15, while FIG. 8 is a memory map showing in detail part (image display data area 154) of the memory space of the RAM 15. The RAM 15 includes various memory areas 150–159. For example, the RAM 15 includes a display list area 150, a program area 151, a frame memory (or image buffer memory) area 152 for temporarily storing one frame of image data, a Z buffer area 153 for storing depth data on a dot-by-dot basis in the frame memory area, an image data area 154, a sound memory area 155, an area 156 for memorizing an operational state data on the control pad, a working memory area 157, a fellow data area 158, and a register flag area 159. The memory areas 151–159 are memory spaces that are accessible by the CPU 11 through the bus control circuit 121 or directly by the RCP 12, so that they each have an arbitrary capacity (or memory space) assigned depending upon a game being used. The program area 151, the image data area 154, and the sound memory area 155 temporarily memorize a part of the data, e. g. a game program required for a certain one course or stage, of a one-game all-scene (or stage) game program stored in the memory areas 22, 24, 25 of the ROM 21, when it is transferred thereto. If a part of program data required for a certain scene is stored in the memory areas 151, 154, 155 in this manner, the CPU 11 is enhanced in efficiency higher than the processing by directly reading out of the ROM 21 each time required by the CPU 11, thus raising the image processing speed.

Specifically, the frame memory area 152 has a memory capacity corresponding to the number of picture elements (pixels or dots) on the display 30×the number of chrominance data bits per one picture element, so that it store chrominance data for each dot correspondingly to the picture elements on the display 30. The frame memory area 152 temporarily stores the chrominance data on a dot-by-dot basis of an object that can be seen from the observer's eye, based on the three-dimensional coordinate data for representing, in a set of a plurality of polygon, one or more of the stationary objects and/or the movable objects memorized in the image data area 154 to be displayed in one background scene in an image processing mode. The frame memory area 152 also temporarily memorizes, in a display mode, the chrominance data on a dot-by-dot basis when displaying various objects memorized in image data area 154 including the movable objects, i. e. the player object, the fellow objects, the enemy objects, the boss object, and the background (or stationary) objects, etc.

The Z buffer area 153 has a memory capacity corresponding to the number the picture elements (pixels or dots) on the display 30×the number of bits of depth data per one picture element, so that it memorizes depth data on a dot-by-dot basis corresponding in a manner to the picture elements of the display 30. The Z buffer area 153, in the image processing mode, temporarily memorizes the depth data for each dot of the object that can be seen from the observer's eye, based on the three-dimensional coordinate data for representing, in a set of a plurality of polygons, one or more of the stationary objects and/or the movable objects. The Z buffer area 153 also temporarily memorizes, in the display mode, the depth data for each dot of the movable and/or stationary objects.

The image data area 154 memorizes coordinate data and texture data for polygons, in a plurality of sets of which constitute each of the stationary and/or movable objects stored, for game display, in the ROM 21 so that at least one of course or stage data is transferred thereto from the ROM 21 prior to an image processing operation. The detail of the memorized data in the image data area 154 will be explained with reference to FIG. 8.

The sound memory area 155 is transferred by a part of sound data (data of phrases, music and effect sounds) stored in the memory area of the ROM 21 which is temporarily memorized as sound data to be generated through the sound generating device 32.

The control pad data (operational state data) memory area 156 temporarily memorizes operational state data representative of an operating state read out of the controller 40.

The working memory area 157 temporarily stores data such as parameters, during execution of a program by the CPU 11.

The fellow data area 158 temporarily stores data for display-controlling the fellow object stored in the memory area 22k.

The register flag area 159 includes a plurality of register areas 159R and a plurality of flag areas 159F. The register area 159R includes registers R1–R3 for loading with the amounts of respective damages to a main body, a left wing and a right wing, a register R4 for loading with the damage to the fellow, a register R5 for loading with the damage to the enemy (boss), a register R6 for loading with the number of the player objects, a register R7 for loading with the player's life count, a register R8 for loading with the number of the enemy objects to be displayed on one scene, a register R9 for loading with the number of the stationary objects, a register R9 for loading with the score points in a course being played, registers R11–R1n for loading with score points for the course 1–n, a register R20 for loading with the total points and a register R21 for loading with a highest point. The flag area 159F is an area for memorizing a flag by which the state of the game under progress is known, and includes, for example, a fellow flag F1, a mode flag F2 for discriminating a mode of display range, phrase flags F31–F3m for memorizing whether a phrase 1–m should be outputted or not, a game-over flag F4 for discriminating the presence or absence of detection on a condition of reaching a game over, and hit determination flag F5.

Figure 9:
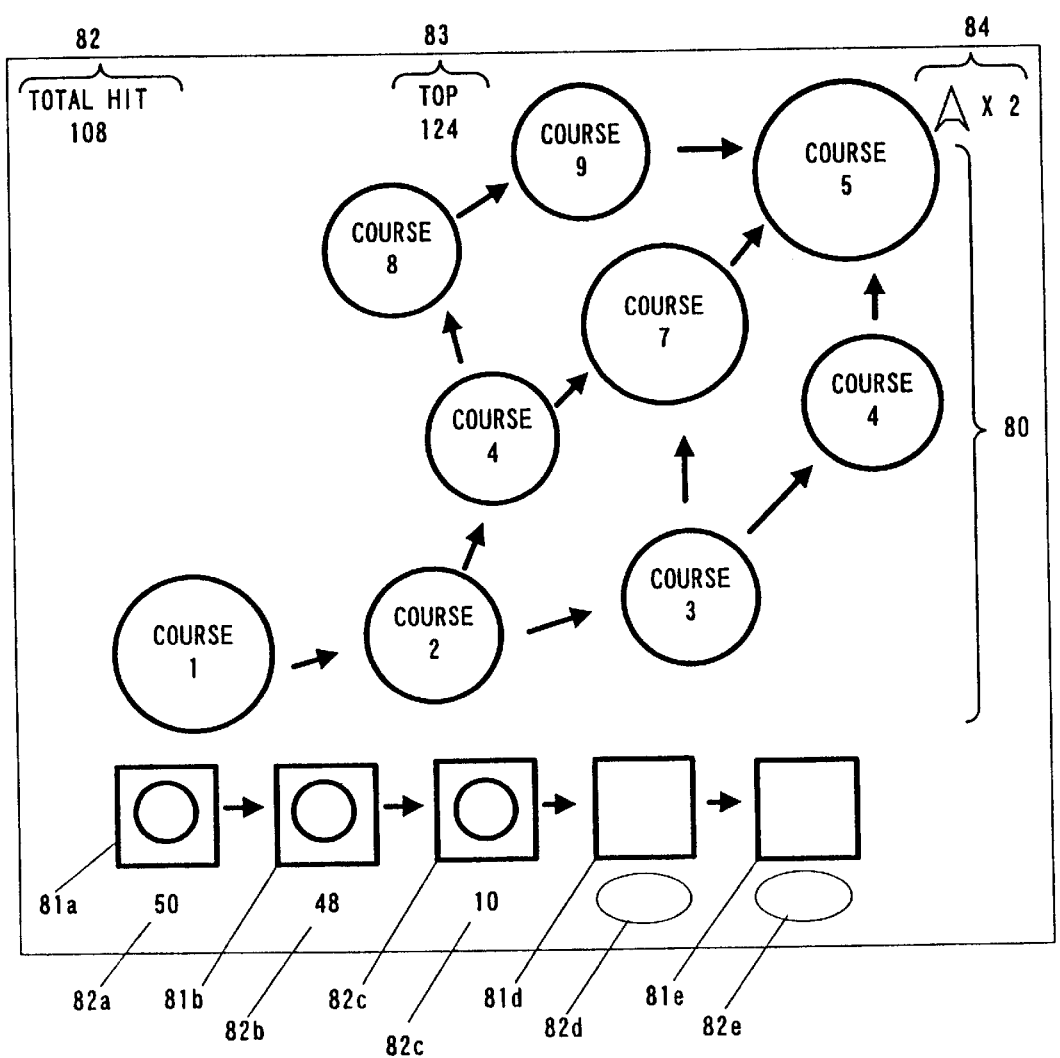
FIG. 9 is a view showing game courses of one example to which this invention is applied.
Figure 11:
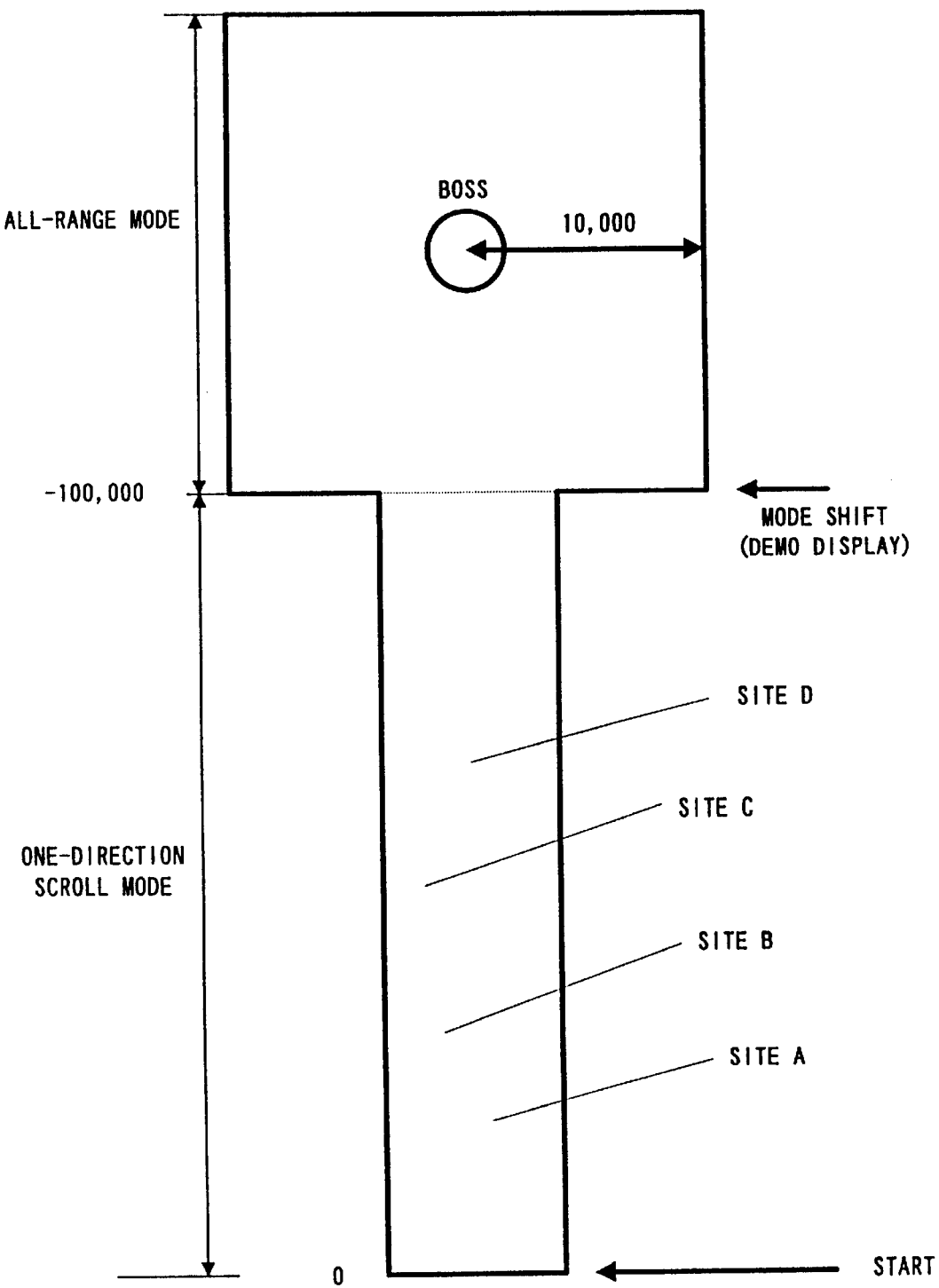
FIG. 11 is a diagram showing a game area map for explaining a game content of one example to which this invention is applied.

FIG. 9 is a view showing one example of game courses to which the present invention is applied. FIG. 10 is a view showing a course choosing screen for the game shown in FIG. 9. FIG. 11 is a diagram showing a game area map for explaining one example of a game content to which the present invention is applied. FIG. 12 is an illustrative view showing a message output content in a process of communication with a fellow in the FIG. 11 game. FIG. 13 is a diagram showing one example of an on-screen representation of a message output that is represented based on the communication process with the fellow in the FIG. 12 game. FIG. 14 is a view showing one example of an on-screen representation in a state of waging war against a boss character in the FIG. 11 game.

Referring to FIG. 9–FIG. 14, explanations will be made on the outline of the video game to output a message helpful for advancing the game, which constitutes a feature of the present invention. Although the game content of the video game is determined by the program stored in the ROM 21, a shooting game example will be shown in the embodiment. At a start of the game, the courses shown in FIG. 9 are displayed. In FIG. 9, display is given for clear course display areas 81a–81e below a course display area 80, indicating a cleared state on a course-by-course basis. A course score display area 82 and a high score (top points) display area 83 are displayed in an upper portion of the screen.

At an initial stage of the game, if a course 1 is selected, a scene of a start point of FIG. 11 is displayed as shown in FIG. 12. The long distance from a start point to a mode shift point, shown in FIG. 11, (e.g. a hundred thousand in a depth coordinate unit; unit arbitrary) is chosen as a display region for one-direction scroll mode. The one-direction scroll mode display region has a width selected in the same as the screen size that can be displayed on a display screen 31 of the display 30, being used for scroll display from the upper to the lower. In the one-direction scroll mode display region, display is made, in order, for the objects 71–71n (see FIG. 12) constituting background pictures, such as buildings, trees, mountains, roads, and sky, representing backgrounds or stationary objects on the course. At predetermined points A–D in simulated three-dimensional space, which are referred to in FIG. 11 as SITE A, SITE B, SITE C, and SITE D, respectively, in the midway thereof, a plurality of enemy objects 72a–72n appear to attack a player object 60 or obstruct the player object 60 from advancing forward.

The FIG. 11 Sites A, B, C, D in the course of the one-direction scroll mode display region are determined as sites to output, in display or sound, a message (or phrase) for letting the player know an appropriate manipulating way or assisting the player object 60, in order to repel away the enemy objects 72a–72n or skillfully avoid their attacks. As shown in FIG. 12, a message is displayed on the display area 31a. A fellow's face who are sending the message is displayed on the display area 31b. The score under playing is displayed in the display area 31c, and the life (amount capable of withstanding against the damage) is displayed on the display area 31d.

The messages, as concrete examples, are illustratively shown in FIG. 13. Among a plurality of messages, a message set for a site by the program is displayed in the display area 31a. In this game example, there is shown a case that phrases are output in sound and picture in different ways depending on the kind and scene of a person or entering character so that a message is taught by a fellow as to a manipulating method suited for the situation in relation to the phrase occurrence. The phrases 1–9 have a priority order so that, when detecting a condition of generating a plurality of phrases at the same time, a higher preference order phrase is generated. In relation to the display of a message, a face of the fellow object 73 sending the message is displayed. The message includes a control method (a message "get over with brake" for designating deceleration) where the player object 60 is assumed to be a fighter, and a manipulating way telling as to which switch should be operated in what manner on the controller 40 for achieving the control method (a message "C button down" indicative of depression of the button 47Cd: preferably displaying a different color of lower buttons among four buttons arranged at the upper, lower, left and right). In addition, to the message display, sound outputting ("get over with brake") is also made, as required. At the site C is generated a message "twice depressing either Z or R" telling on depressing the switch 47Z or 47R two times. In this manner, the message content is different by the site A–D depending upon the shape or movement of the enemy object. If the player manipulates the joystick 45 to control the position and direction of the player object 60 and operates a switch, of the switches 47A–47Z, in conformity to the message output, he can easily perform an appropriate operation even where the number of the switches is many and appropriate and quick switch operation is difficult or impossible. It is possible to easily attack the enemy or avoid crises by quickly doing the indicated operation. The player, even if unskilled, is easy to proceed to forward scenes.

When the player object 60 reaches a mode shift point, the display mode is shifted into an all-range mode in which scrolling is possible in every direction. In the all-range mode, a boss character (boss object) is placed at a center of a displayable area so that the player object 60 can make attacks on the boss character 74 while turning around thereof. The range over which the player object 60 can move about is selected in a short distance (e. g. a hundred thousand) in direction of upper, lower, left and right with respect to the boss character 74. When the player object 60 comes close to a boundary of the moving range, the camera photographing the player object 60 is changed over in direction to thereby automatically change the moving direction of the player object 60. At this time, a size-reduced map is displayed in the map display area 31c in the lower right of the display screen 31 so that the player can readily know the position the player object 60 is standing. The map includes the display of symbols of the boss character 74, the player object 60 and the fellow object 73.

FIG. 15 is a main flow chart of a video game system of one embodiment of the present invention. Referring to FIG. 9–FIG. 15, explanations are briefly made on the principle of this invention in conjunction with the main flow chart of FIG. 15.

Upon turning on power, the CPU 11 during starting sets the video game machine 10 to a predetermined initial state. For example, the CPU 11 transfers a start program among the game programs stored in the program area of the ROM 21 to the program area 151 of the RAM 15, to set parameters to their initial values, and thereafter execute, in order, processes of the FIG. 15 flowchart.

The flow operation of FIG. 15 is executed on every 1 frame (1/30 second). Before clearing the course, a step 1 (denoted with "S" in the Figure), a step 2, and step 3–step 17 are executed, and thereafter a step 3–a step 17 are repeated of operation. When if the game is ended without success in course clearing, a game-over process of a step 18 is executed. If the course clear is successfully made, the process returns from the step 16 to the step 1.

That is, although at the step 1 display is made for the game course scene and/or course choosing scene, a course scene as shown in FIG. 9 is displayed if the game is started after turning on the power. After advancing to course 2 by clearing course 1 shown in FIG. 9 and the course 2 is also cleared, a course choosing screen as shown in FIG. 10 is displayed. When choosing a course on the course choosing screen, a course-choosing subroutine as shown in FIG. 16 (operations of steps 101–116) is executed. This, however, does not constitute an essential part of the present invention, and therefore a flowchart only is shown to thereby omit detailed operational explanations.

Since the game of the course 1 is performed immediately after the start, the game starting process is made for the course at the step 2. For example, the register area 159R and the flag area 159F are clear-processed (initial values are set for the registers R6, R7), and various data required for performing the game for the course 1 (or a selected course) is read out of the ROM 21 and transferred to the memory areas 151–155 of the RAM 15.

At the step 3, a mode-shift subroutine process is performed. The player object 60 is present at the start point in FIG. 11 immediately after starting the game. However, the time period between the start point (Z coordinate=0) and the mode-shift point (Z coordinate=−a hundred thousand) lies in the one-direction scroll mode. Accordingly, it is determined at a step 121 in FIG. 17 that the player object is not present at the all-range mode position, so that a flag F2 is reset at a step 122 to make shifting to the one-direction scroll mode, and then the process proceeds to the next step 4. The detailed operation thereof will be discribed later with reference to FIG. 17.

At the step 4, a controller process is performed. This process is performed by detecting as to whether any of the joystick 45, the cross switch 46 and the switches 47A–47Z of the controller 40 is operated or not. The detected data (controller data) on the operating state is read, and the read controller data is written. The detailed operation will be discribed later with reference to FIG. 18.

At the step 5, a process of communication with a fellow is performed. This process is made by displaying or sound-outputting a message telling an appropriate manipulating way, which constitutes a feature of the present invention. That is, the player is known of an appropriate manipulating way, at the site A–D in the one-direction scroll period shown in FIG. 11, by being indicated, or sound-outputted, with a message or phrase as shown in FIG. 13. The detailed operation thereof will be stated by an example stated later with reference to FIG. 19–FIG. 21. Incidentally, it is pointed out that the content or occurring condition of a message is mere one example and it differs depending upon the content or kind of a game, and can be modified for usage.

At the step 6, a replenishing process is performed to supply materials from a headquarter. In this process, items for assisting the player (e.g. parts for repairing a wing of a fighter, firearms, rifles, etc.) are sent from the headquarter or a fellow, even where the player object 60 is raided by an enemy and a fuselage suffers damage and normal fight is impossible. When an item is displayed on the screen, if the player performs an operation to acquire the same (overlapping the fuselage over the item, hit the item by shoot, etc.), the damaged portion can be restored to a former state or an item advantageous for attacking the enemy can be offered for. In this case, since the item required by the player differs depending upon a state of the damage to the player object, the kind of items is automatically determined according to a predetermined preferential order. The detailed operation will be stated later with reference to FIG. 22 and FIG. 23.

At the step 7, a process for displaying the player object 60 is carried out. Although this process differs depending upon whether the player object 60 exists in any of the one-direction scroll region and the all-range region, it is basically a process of changing the direction or shape based on the operating state of the player-operated joystick 45 and the presence or absence of an enemy's attack. For example, the control in display of the player object 60 is made by calculating after-change polygon data that is based on the program transferred from the memory area 22j, the polygon data of the player object transferred from the memory area 24a, and the operating state of the joystick 45. The chrominance data is written to addresses in the memory area 154a corresponding to a surface of a plurality of triangles constituting a plurality of polygons thus obtained so as to put thereto a pattern or color paper designated by the texture data.

At the step 8, camera processing is performed. For example, coordinate calculations are made for an angle at which the object is viewed such that the observer's eye or view site as viewed through a finder of a camera takes an angle designated by the player.

At the step 9, a fellow object process is performed. The fellow object is calculated to a predetermined positional relation to the player object in the one-direction scroll region. For example, the fellow object is not displayed when it is flying behind the player object 60, while, when the player object 60 decelerates, a calculating process is made to display as if it was flying in front thereof. In the all-range region, when the fellow object is flying in front of the player object 60, it is displayed together with the fellow's fuselage by symbols in a size-reduced map. When it is flying on a rear side, it is displayed only by a symbol in the size-reduced map. The detail will be stated later with reference to FIG. 24–FIG. 26.

At the step 10, a process of the enemy object is performed. In this process, the display position and/or shape of the enemy object 72a–72n is determined by calculation of polygon data to display a varied image such that it moves to attack the player object 60 or obstruct the advancement thereof while judging on the movement of the player object 60, based on the program partly transferred from the memory areas 22l and 24d. Due to this, the enemy object acts in a manner having a certain effect upon the player object 60. The detail will be stated later with reference to FIG. 27 and FIG. 28.

At the step 11, a process of the background (for stationary) object is performed. In this process, the display position and shape of the stationary object 71a–71n is determined by calculation based on the program partly transferred from the memory area 22m and the polygon data of the stationary object transferred from the memory area 24c. The detail will be stated later with reference to FIG. 29.

At the step 12, the RSP 122 performs a rendering process. That is the RCP 12 performs, under the control of the CPU 11, a transforming process (coordinate transforming process and frame memory rendering process) on the image data for displaying the movable object and the stationary object, based on the texture data for the movable object, such as the enemy, the player, the fellow, and the stationary object such as the background memorized in the image data area 154 of the RAM 15. Specifically, chrominance data is written into addresses in the memory area 154d corresponding to the plane of the triangle constituting a plurality of polygons for the movable object or the stationary object, in order to affix a color designated by the texture data determined for the object. The detail will be stated later with reference to FIG. 30.

At the step 13, the RCP 12 performs a sound process based on sound data such as on a message, a music and an effect sound. The detail will be stated later with reference to FIG. 31.

As a result of rendering process at the step 12 by the RCP 12, the image data stored in the frame memory area 152 is read out, whereby the player object, the movable object, the stationary object, the enemy object, etc. are displayed at the step 14 on the display screen 31.

At the step 15, a sound such as a music, an effect sound or speech is outputted by reading the sound data obtained by the sound process at the step 13 by the RCP 12.

At the step 16, it is determined whether the course is cleared or not (course-clear detection). If the course is not cleared, it is then determined at the step 17 whether the game is over or not. If not game-over, the process returns to the step 3 whereby the steps 3–17 are repeated until the condition of game-over is detected. If detection is made for a condition of the game over, e.g. the number of mistakes forgiven for the player becomes a predetermined number or the life of the player object is spent by a predetermined amount, a game-over process is carried out at the following step 18 with a selective process of continuing the game or saving backup data. Incidentally, at the step 16 if the condition of clearing the course (e.g. the boss overthrown, etc.) is detected, the course-clear process is made at the step 19, and then the process returns to the step 1. Here, the course clear process involves, for example, loading a register-stored course score gained in the play immediately before onto a corresponding course-score register so as to indicate the course score as a course points in FIG. 11. If a plurality of courses are cleared, the total points are determined and displayed. Incidentally, the calculation of a course score may be added, as required, by a bonus point for a course clear.

Explanations will be made hereinbelow on the detailed operation for each subroutine.

Referring to FIG. 17, the operation of a subroutine for the mode shift process (the step 3 of the main routine) will be explained. If the player object reaches the mode shift point in FIG. 11, it is determined (or detected) at a step 121 that it exists at the all-range mode position, and at a step 123 it is determined whether a demonstration (hereinafter referred to as "DEMO") process in the all-range mode is ended or not. It is determined for the first time that the DEMO process is not ended, and an image process for DEMO display in all-range mode is performed at a step 124. A sound process is executed a step 125 for generating a DEMO sound in the all-range mode, and then the process proceeds to the aforesaid rendering process at the step 12.

On the other hand, if it is determined at the step 123 that the DEMO process is ended, a shift process to the all-range mode (changing a mode flag F2 to the all-range mode) is made at a step 126, and then the process returns to the main routine.

This provides an advantage that the scroll range can be shifted over without giving such a strange impression that the screen scroll direction is abruptly changed upon shifting from the one-direction scroll mode to the all-range mode. Also, the shift of the scroll range releases the burden from the CPU during the one-direction scroll period, as compared to the case that the scroll range is placed in the entire range over the entire course duration. It is also possible to give scroll display in a diversified way as compared to the one-direction scroll over the entire course period. Thus, a variety of image representations are possible for a game, providing an advantage of enhancing further player's interests Referring to FIG. 18, explanations will be made on the operation of a subroutine for the controller process (step 4). It is determined at a step 131 whether there has been a read request command for the controller data or not. If nothing, a read request command is waited, at the step 131, for its generation. If the presence of a read request command is determined, a command is supplied to the controller control circuit 18 at a step 132. In response thereto, the controller control circuit 18 performs a process of reading the operating state data on the controller 40A–40D. At a step 133 it is determined whether or not the reading of the operating state data by the controller control circuit 18 has been ended for all the controllers 40A–40D. If not ended, the ending is waited for. If ending is detected, the operating state data for each controller 40A–40D is written, at a step 134, into the memory area 156 in the RAM 15 via the bus control circuit 121 from the controller control circuit 18.

Referring to FIG. 19–FIG. 21, explanations will be made on the operation of a subroutine for the communication process (step 5) with the fellow. It is determined at a step 141*a* whether the player object has reached the site A or not. If not reaching the site A is determined, the process returns to the main routine after processing at steps 141*b*, 141*c*, 151*a*, 151*b*, 151*c*, 151*d*. Meanwhile, if the player object has reached the site A is determined at the step 141*a*, then it is determined at a step 142*a* whether a fellow 1 exists or not. If the first fellow exists, it is then determined at a step 143*a* whether a phrase or message is now under processing or not. If it is determined that a phrase is under processing, a corresponding flag among the phrase flags F31–F3*n* to the phrase is turned on, and comparison in priority order is made, at a step 144*a*, due to the necessity of selecting any one of a plurality of phrases. It is determined at a step 145*a* whether the priority order of a phrase 1 is higher than the phrase currently under processing at a step 145*a*. If higher, the process advances to a step 146*a*. At the step 146*a* a display process for the phrase 1 is carried out. For example, the phrase 1 is a message (get over with brake) from the first comrade to the player object so that it averts from attacks by an enemy appearing at the site A. A message is displayed to instruct the depression of the lower button (switch 47C*d*) of the switch 47C as an operating way therefor. At a step 147*a* a process is made for outputting the phrase 1 in sound.

Incidentally, if it is determined at the step 143*a* that no phrase is under processing, there is no necessity of judging on the preference order so that the process proceeds to the step 146*a*. If the absence of a first fellow is determined the step 142*a* or the phrase under process has a lower preference order than the phrase 1 is determined at the step 145*a*, the process returns to the main routine.

On the other hand, if it is determined that the player object exists at the position B instead of the position A, the operations at the steps 141*b*–147*b* are carried out. The steps 141*b*–147*b* are for outputting a phrase 2, which are similar to the operations for the steps 141*a*–147*a*. Accordingly, the corresponding step No. is represented followed by a symbol "b" in place of the symbol "a", omitting explanations in detail thereof.

Meanwhile, where the phrase output condition is dependent on time, e.g. where it depends on a time period A from finding the boss, the time period A is determined at a step 141*c*. When a second comrade is present near is determined at a step 142*c*, the operations of steps 143*c*–147*c* are executed. These steps 143*c*–147*c* are concerned with the operation that the second comrade sends a message (phrase 3 in FIG. 13) telling on how to overthrow the boss (assaulting way), the operations of which are the same as the operations of the steps 142*a*–147*a* except for the difference in fellow and phrase, and the detailed explanations are omitted.

In relation to the phrase output condition, a third fellow is kept an eye on by an enemy, the same is determined at a step 151*a* to thereby effect the operations of steps 152*a*–156*a*. The steps 152*a*–156*a* are for the operation to output a message (phrase 5 in FIG. 13) that a fellow teaches how to defeat the boss, and their operations are the same as the operations of the steps 142*a*–146*a* except for the difference in phrase.

When the phrase outputting condition is that the third fellow has been rescued, the same is determined at a step 151*b* to thereby carry out the operation of steps 152*b*–156*b*.

The steps 152*b*–156*b* are the operation to generate a phrase 6 when the third fellow is rescued, and the operations are similar to the operations of the steps 152*a*–156*a* excepting the difference in phrase.

Meanwhile, where the phrase outputting condition is to output a phrase 8 by the player object that has been raided by an enemy, the same is determined at a step 151*c* to effect the operations of steps 152*c*–156*c*. If the phrase outputting condition is concerned with outputting a phrase 9 on which the boss is defeated, the same is determined at a step 151*d* to perform the operations of steps 152*d*–156*d*.

As stated above, a message (phrases 1–4 in the FIG. 13 example) is output in display or sound so that the player is assisted to perform appropriate manipulations. With an appropriate operating method of an advice, the game is easy to advance thereby providing the player with an achievement or satisfactory feeling even if the operating way is difficult. Thus, the scenes or courses are easy to clear over. If a proper message (phrases 5–9 in the FIG. 13 example) is outputted in display and/or sound in conformity to a scene or situation of the game, highly realistic expressions are available in the progress of the game, further enhancing amusement in the game.

Incidentally, the display or sound message generated for helping the player manipulate properly in conformity to a message or situation is not limited to the FIG. 13 embodiment, but can be appropriately modified depending upon the kind or content of a game. Thus, it is not limited to the description of the embodiment. For example, although the operating method on the switch was explained on the case that any one of a plurality of switches is depressed in order to simplify the explanation, it is also possible to determine so as to depress a same switch in plurality of times or depress a predetermined combination of a plurality of switches.

Referring to FIG. 22–FIG. 23, explanation will be made on the operation of a subroutine for the material replenishing process (step 6). Before the player object comes to a predetermined site or position where an item is available, it is determined at a step 161 that the player object has not entered the site. At a step 163, it is determined that a time period (T1) for displaying an item is not set (T1=0). It is determined at a step 170 that it is not under a condition of representing a mark (item box) representing of having a right to acquire an item. At a step 172 it is determined that no item is set, and then the process returns to the main routine. Thereafter, the process of the main routine is carried out on a frame period.

When the player object comes to a place where it can get an item, the same is determined at a step 161. At a step 162, a constant time period (T1) is set to a timer register, as a time period for which display is made for a mark of telling that it is under a condition that an item is obtainable. It is determined at a step 163 that the time period T1 is greater than 0. At a step 164 subtraction (T1−1) is made by a unit time (e.g. 1 second). At a step 165, display is made for a mark by which the player can request an item if he depresses an item display request switch (e.g. 47 Cr). It is determined at a step 166 whether or not the item request switch is depressed. If no depression is determined, then steps 170, 172 are executed, and then the process returns to the main routine. The steps 161, 163–166, 170, 172 are repeated for each frame period, whereby the switch 47 Cr is waited for being depressed within a predetermined time period.

During the repetition of the waiting operation as above, if it is determined at the step 166 that the display request switch is depressed, 0 is set (reset) to the timer register, and preparation is made at a step 168 for outputting a phrase representing that an item is requested by a fellow. This phrase is outputted at the steps 14 and 15 in image and sound. At a step 169, a process (item set process) is performed for displaying a mark (item box) showing of under a condition that an item is possible to obtain. At a step 170, it is determined at the condition that an item box can be displayed. At a step 171, a process is performed for displaying an item box. When it is determined at a step 172 that the display of the item box is being made, it is determined at a next step 173 whether or not the player performed an operation for obtaining the item box (e.g. operation of firing at the item box or operation of overlapping the player object over the item box, or the like). If it is determined that the item box has obtained, a process is made at steps 173–180 for supplying an item required depending upon a state of the player object. For example, if the player object is a fighter in a shoot game, it is determined at a step 174 whether the wing is in a predetermined state. If a predetermined wing does not exist, a wing is offered as a replenishing item at a step 175. If a predetermined wing exists, it is determined at a step 176 whether or not the life or a damage-withstanding amount is not greater than a constant value (128). If the not greater is determined, an item for restoring the life is provided at a step 177. If the life is greater than the constant value (128), it is determined at a step 178 whether or not there are two beam artilleries (twin beam). If an existence is determined, a twin beam is provided at a step 179. If the presence is determined, a bomb is offered for at a step 180.

In this manner, the item effective for advancing the game by the player is supplied depending upon the state of the player object so that the player is facilitated to continue the game to forward scenes or clearing over the course. Thus, the player easily obtains an achievement or satisfaction feeling in the game. Also, the player can play with a feeling as if he receives instructions while actually controlling a fighter or makes a flight while receiving assistance, with game interest raised. Incidentally, the supply item is different depending on the kind or content of the game so that the game soft developer could make various modifications with reference to the technical idea described in this embodiment.

Figure 24:
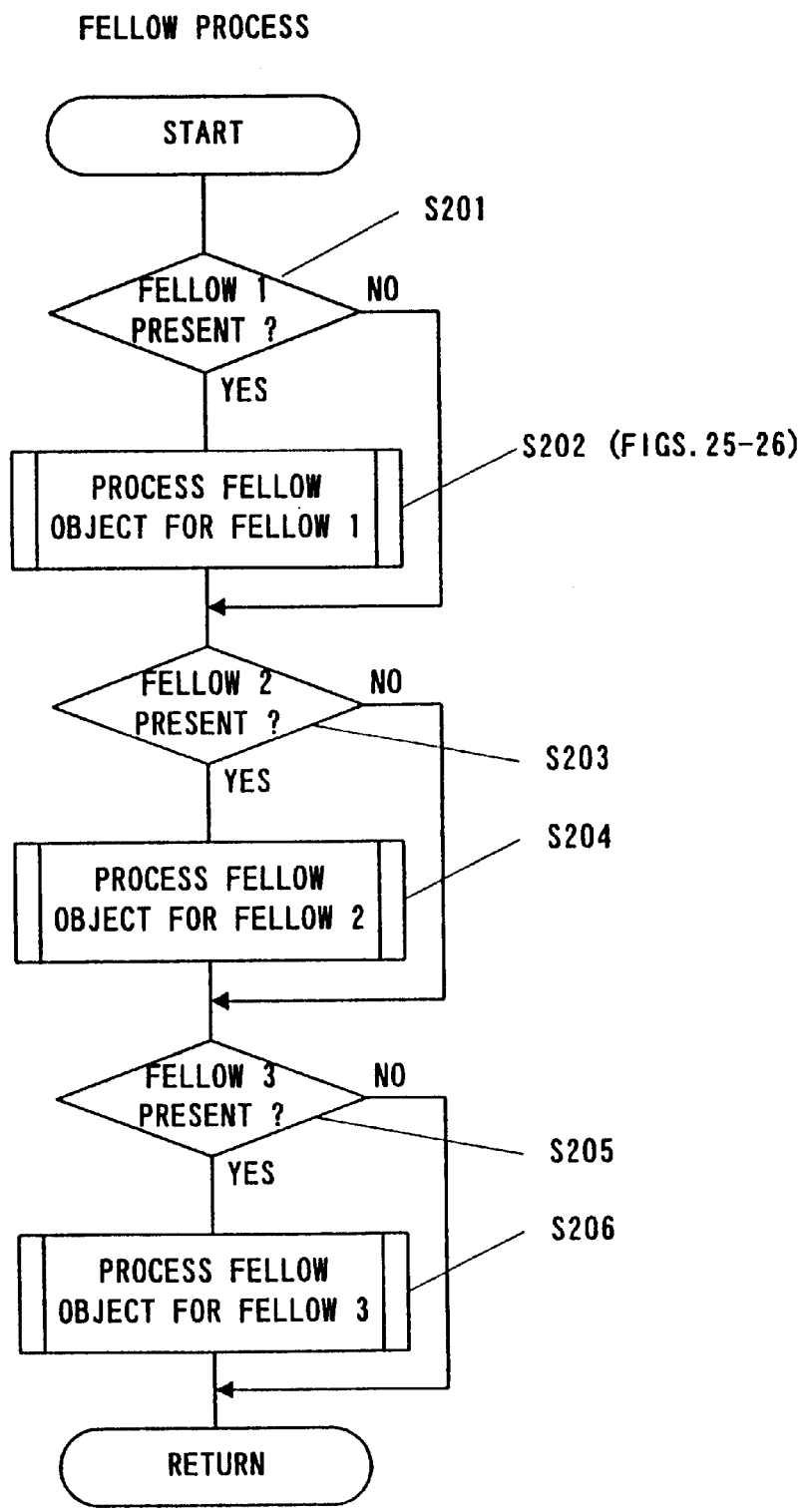
FIG. 24, FIG. 25 and FIG. 26 are a subroutine flowchart for a fellow object process.
Figure 25:
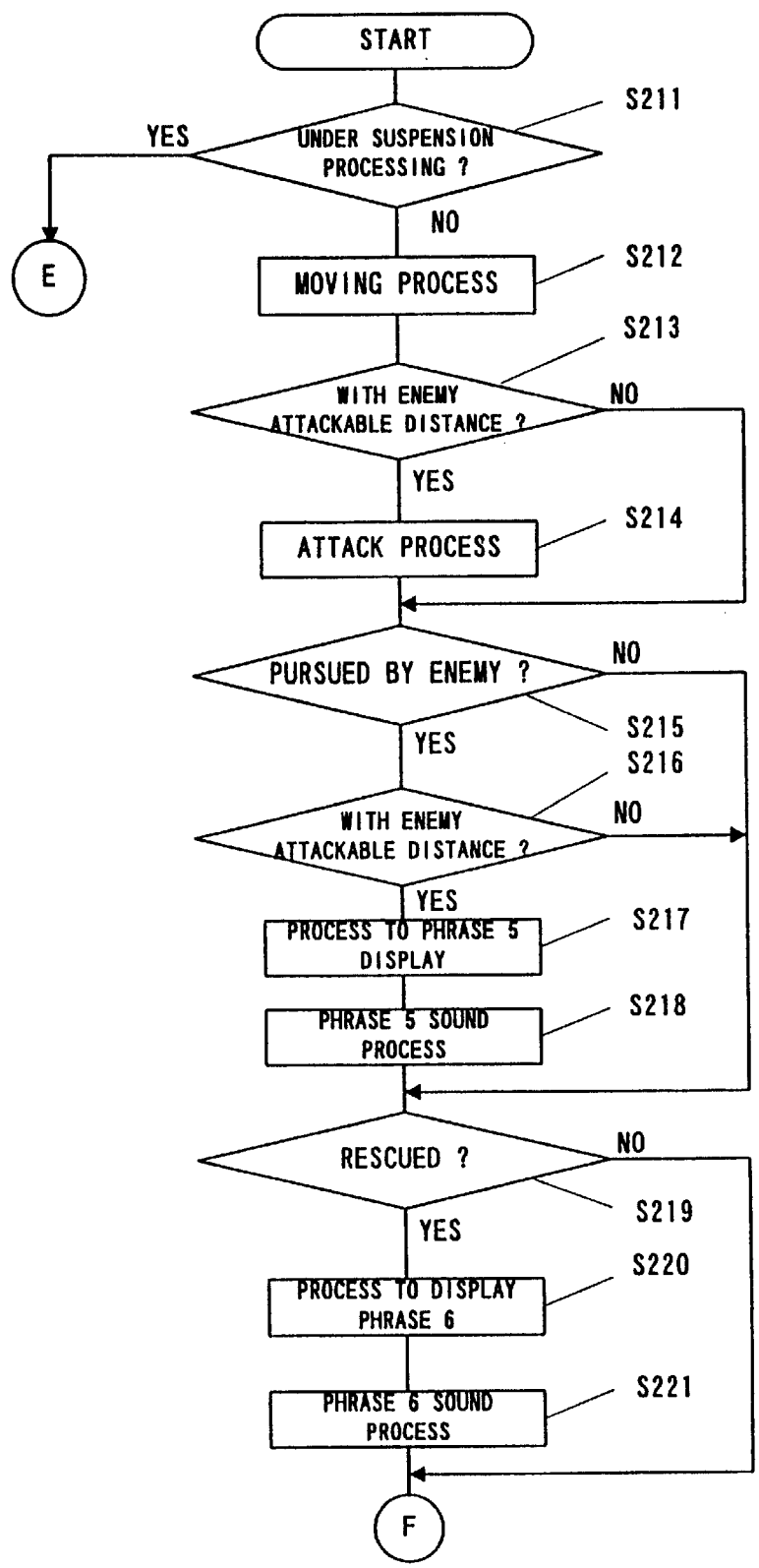
Figure 26:
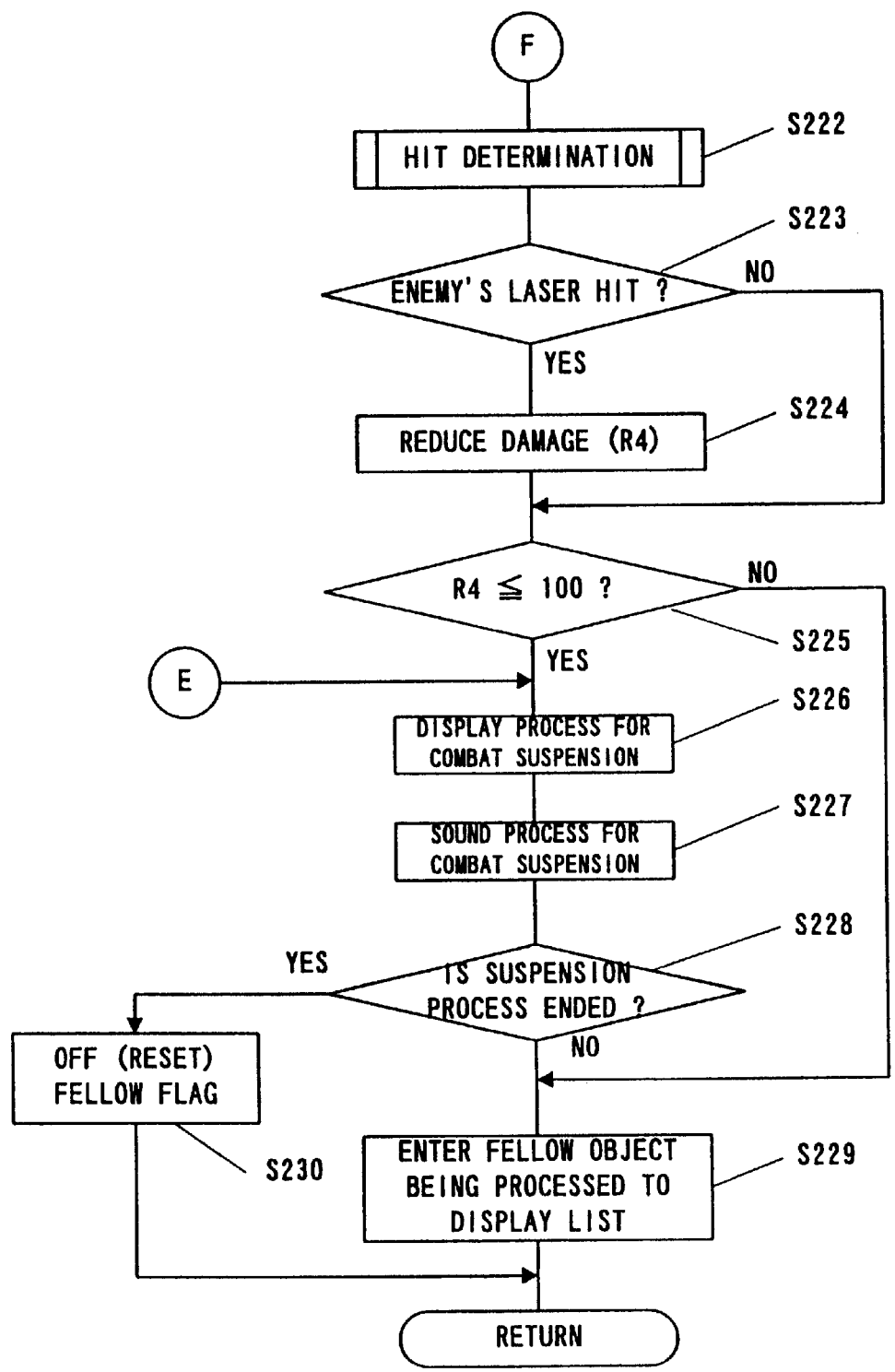

With reference to FIG. 24–FIG. 26, explanations will be made for the operation of a subroutine for the fellow object process. It is determined at a step 201 whether a first fellow is present or not. If the fellow is present, a process is made at a step 202 for the first fellow object. Thereafter, it is determined at a step 203 whether a second fellow exists. If the fellow exists, a process is performed at a step 204 for the second fellow object. Similarly, a determination is made on the presence or absence of a third fellow and the process for the third fellow object are carried out, at steps 205, 206. Here, the processes for the first to third fellow objects shown in the steps 202, 204, 206 are the same except for the difference in fellow kind, and they are realized in concrete by a subroutine process (steps 211–230) of FIG. 25 and FIG. 26.

That is, it is determined at a step 211 that the process is not in a suspension process, and a moving process is performed at a step 212 for moving any of the first to third fellows. Determination is made at a step 213 whether the distance is within a range attackable on the enemy. If within an attackable distance range, a process of making attack on the enemy object (process of calculation and display for launching a beam bomb) is performed at a step 214. It is determined whether any comrade is being pursued by an enemy at a step 215. If pursued is determined, determination is made whether or not he is within a distance attackable by the enemy. If the enemy is within the attackable distance, a process for indicating the phrase 5 (e.g. "help") is performed at a step 217, and a sound output process for the phrase 5 is made at a step 218. Incidentally, if the determination at the step 215 and/or 216 is different one (No.), it is then determined at a step 219 whether or not any of the fellow objects was helped by the player object. If helped is determined, a display process for the phrase 6 (e.g. "We've helped!") is made at a step 220. A sound output process for the phrase 6 is made at a step 221.

At a step 222, a hit determination (e.g. determination whether or not a fellow is hit by an attack at a step 254 to be stated later) is performed when the fellow is attacked by the enemy. It is determined at a step 223 whether or not he is hit by an enemy's bullet. If he is hit, a process for reducing the fellow's damage subtraction of value from the register R4 is made at a step 224. It is determined at a step 225 whether or not the damage withstanding amount of the register R4 is 100 or below. If the above, the process proceeds to a step 229, while if not greater the process proceeds to a step 226. At the step 226 is performed a display process for a message that the comrade damaged by a certain amount or greater ceases the combat to return to a base, and a sound outputting process therefore is performed at a step 227. It is determined at a step 228 whether or not a cease fire process is ended. If not ended, at a step 229 is made a process for entering the comrade object being processed to the display list. If ended, the fellow flag Fl is turned off, and then the process returns to the main routine.

Figure 27:
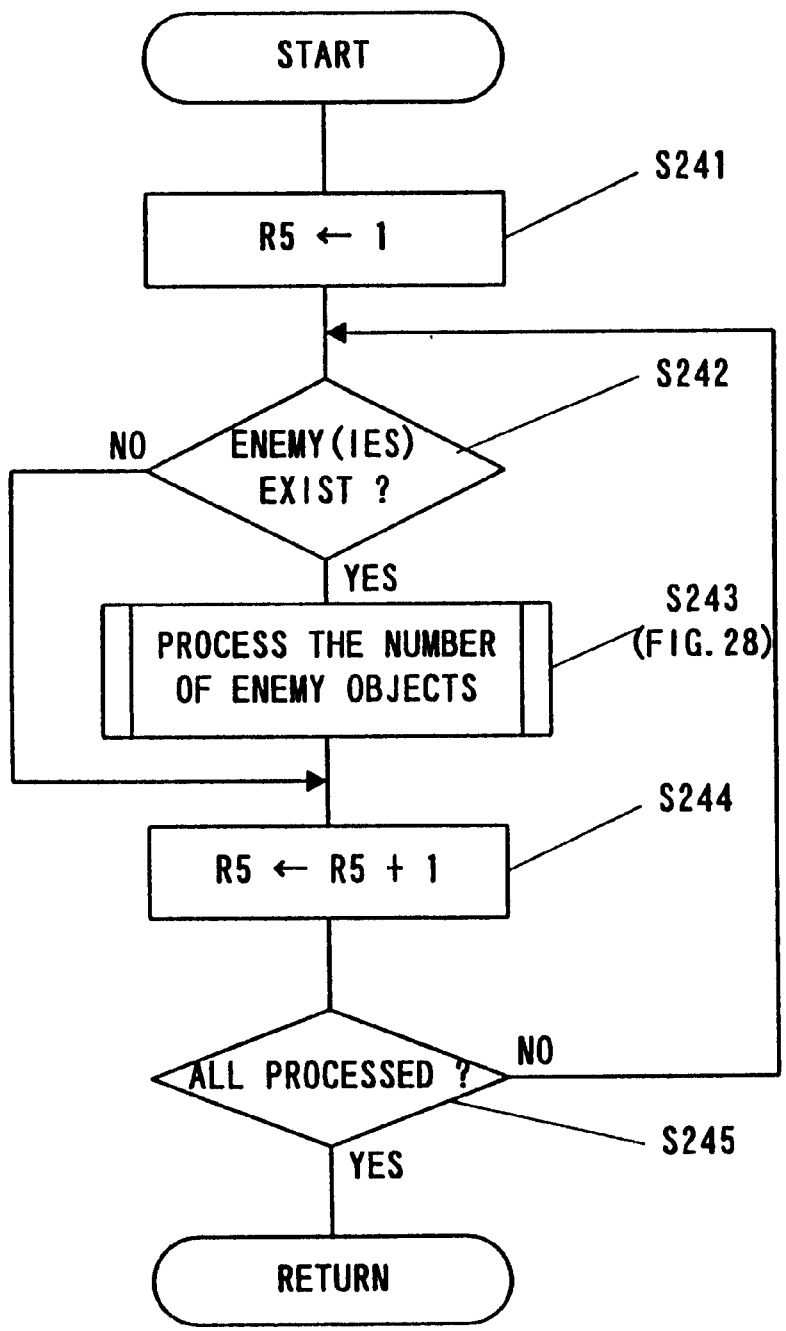
FIG. 27 is a subroutine flowchart for an enemy object process.

Referring to FIG. 27, explanations will be made on the operation of a subroutine for the enemy object process (step 10). At a step 241, the register R5 is set to 1 to temporarily memorize the number of enemy objects. It is determined at a step 242 that there is an enemy object based on the value of the register R5. At a step 243 is performed a subroutine (FIG. 28 hereinafter stated) for processing as to what the number the enemy object is. Then, 1 is added to the register R5 at a step 244. It is determined at a step 245 whether or not ended is a process of displaying all the enemy objects in the number set by the program. If all the processes are not ended, the process returns to the step 242 to repeat the processes of the steps 242–245.

Figure 28:
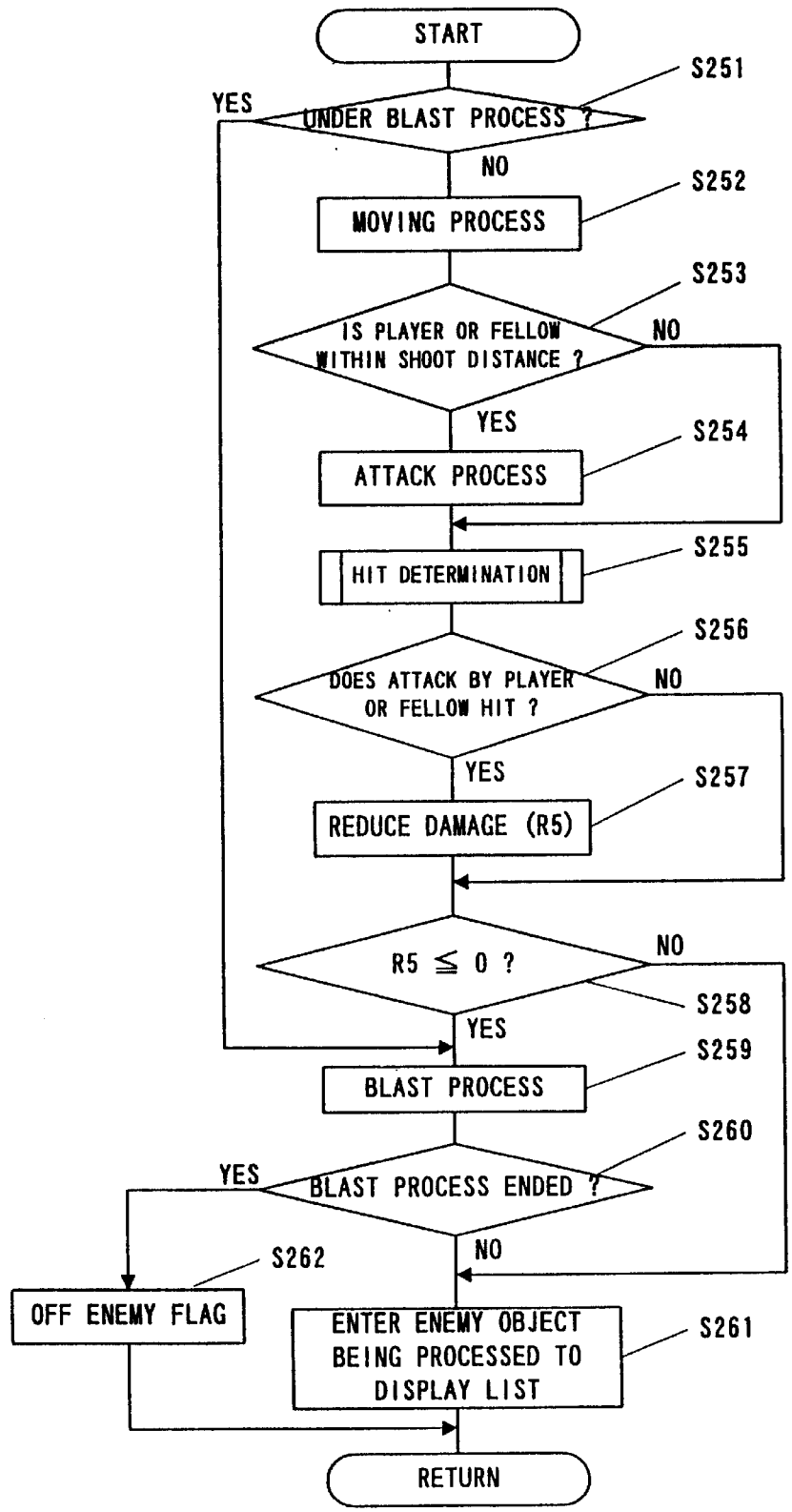
FIG. 28 is a subroutine flowchart showing in detail the operations of part of the steps included in the enemy object process of FIG. 27.

Referring to FIG. 28, explanations will be made in detail on a process for one of the enemy objects. At a step 251 it is determined that the enemy object is not under a blasting process. At a step 252 a moving process is made for the enemy object of the number memorized by the register (E). It is determined at a step 253 whether or not the player object or the fellow object is within a range of shoot. If within a shoot range, a process is made at a step 254 for making an attack on the player object or the fellow object that is present within the shoot distance range.

Meanwhile, at a step 255 is made a hit determination for a case where the player object or the comrade object makes an attack on the enemy object. It is determined at a step 256 whether or not the beam bomb fired by the player object or the fellow object hits the enemy object. If hit is detected, a process is made for reducing an damage amount (subtracting 1 from the register R5) of the enemy object thus hit and providing points to the player (process of adding the points determined depending upon the defeated enemy to the register R10 value). It is determined at a step 258 whether or not the damage amount becomes zero or the below (R5≦0). If not below (R5>0), the enemy object under processing is entered to the display list at a step 261. Conversely, when if below (R5≦0), a process is made at a step 259$f$ or blasting and vanishing the enemy object. If it is determined at a step 260 that the blast process is ended, turning off is made at a step 262 for a flag of the enemy object that has been attacked by the player object, and then the process returns to the main routine.

Figure 29:
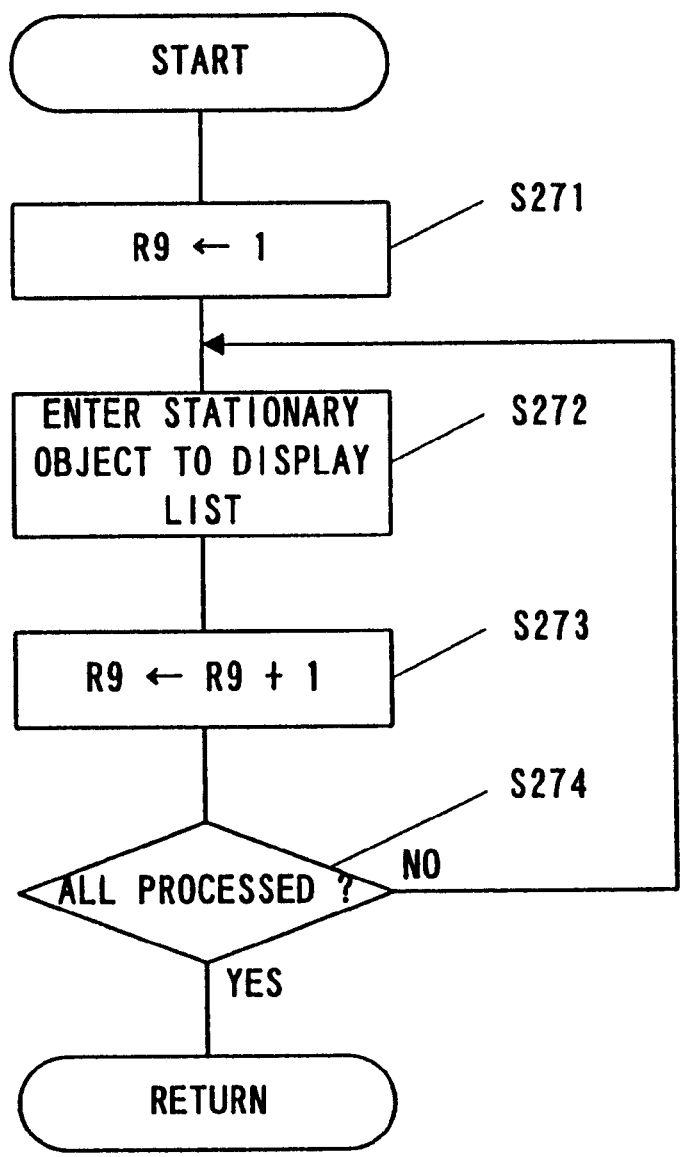
FIG. 29 is a subroutine flowchart for a stationary object process.

Referring to FIG. 29, explanations will be made on the operation of a subroutine for the stationary object process (step 11). At a step 271, a stationary object register (R9) is set at 1. At a step 272 the stationary object specified by the register (R9) is entered into the display list. At a step 273 the register R9 is added by 1. It is determined at a step 274 whether or not ended is a process for displaying all the stationary objects in the number set by the program. If all the processes are not ended, the process returns to the step 272 to repeat the processes of the steps 272–274. If all the processes are ended, the process returns to the main routine.

Figure 30:
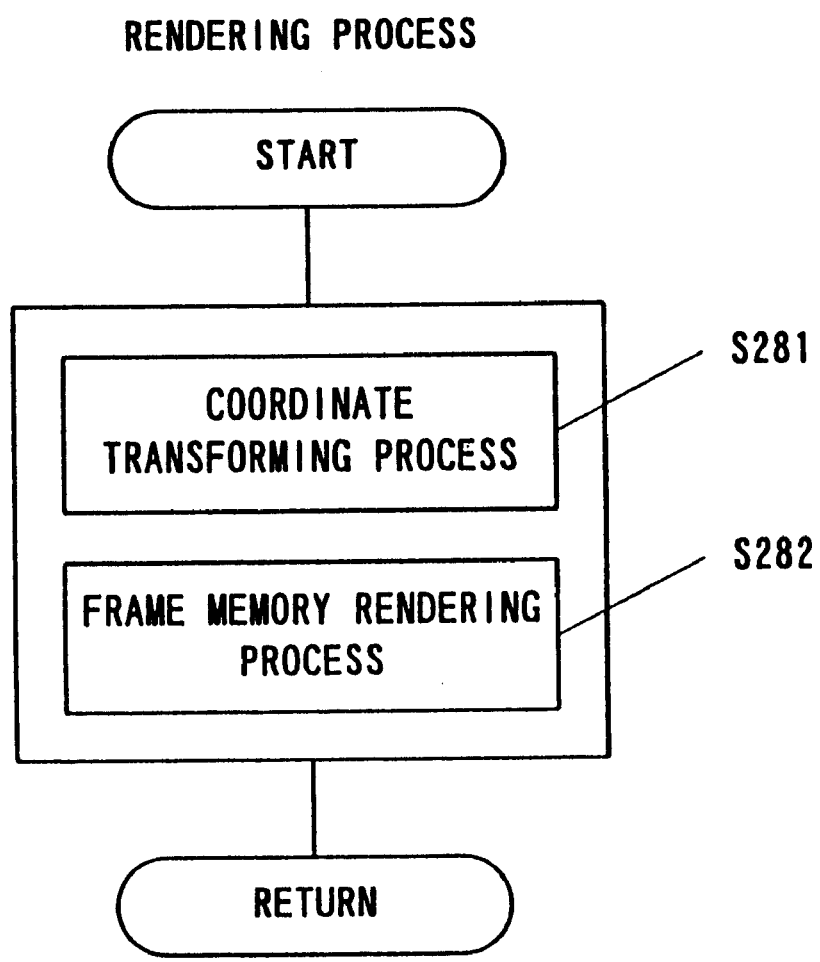
FIG. 30 is a subroutine flowchart for a rendering process.

Referring to FIG. 30, explanations will be made on the operation of a subroutine for the rendering process (step 12). At a step 281 a coordinate transformation process is performed. The coordination transformation process is made under the control of the RCP 12 by transforming the coordinate data of a plurality of polygons for the movable object such as the enemies, the players, and the fellows and the stationary objects such as the backgrounds memorized in the image data area 154 of the RAM 15, into an observer's eye coordinate of the camera. Specifically, calculations are made for transforming the polygon data constituting the plurality of the movable objects and the stationary objects, from the absolute coordinate into camera coordinate data so that they are turned into images as viewed from the camera.

At a step 282 a rendering process is made for the frame memory. This process is performed by writing the chrominance data determined based on the texture data into the image buffer area 152 on a dot-by-dot basis, i.e. at a plane of one triangle constituting the object surrounded by the polygon coordinate after transformed into the camera coordinate. At this time, the chrominance data for a closer object is written so that the object standing toward this (close to this) is preferentially displayed based on depth data for each polygon. In accordance therewith, the depth data corresponding to the dots written by the chrominance data is written to a corresponding address in the Z buffer area 153. Thereafter, the process returns to the main routine.

The operations of the steps 281 and 282 are carried out within a constant time period on each frame. They are, however, processed in order for polygons constituting the plurality of objects to be displayed on one scene, and repeated until the processes are completed for all the objects to be displayed in the one scene.

Figure 31:
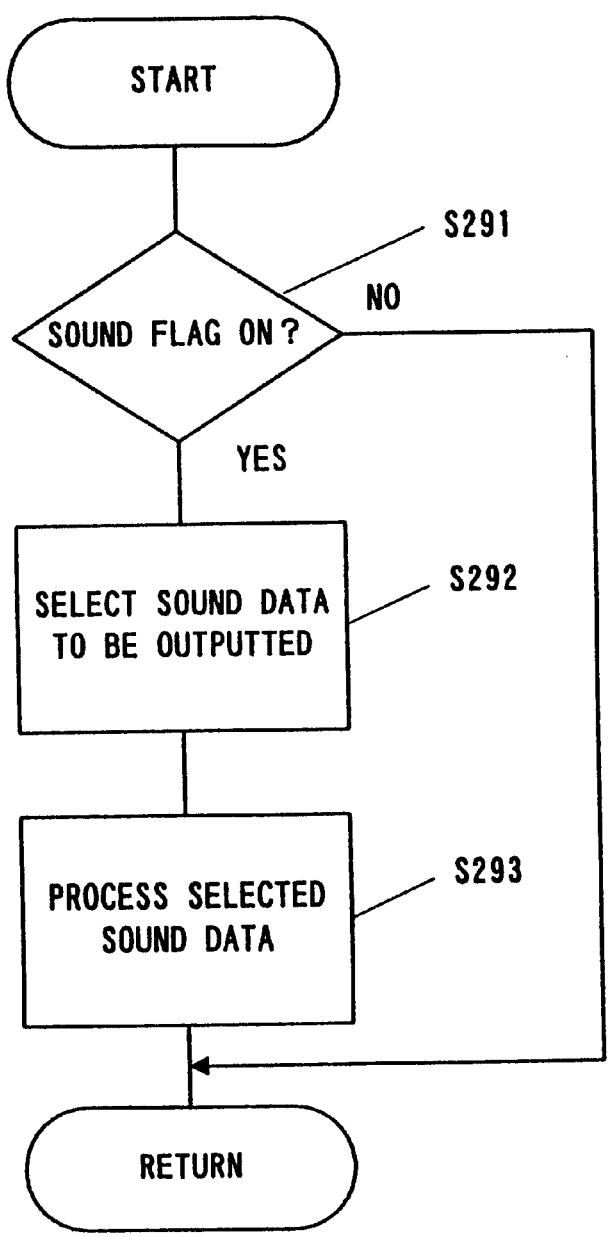
FIG. 31 is a subroutine flowchart for a sound process.

Referring to FIG. 31, explanations will be made on the operation of a subroutine for the sound process (step 13). At a step 291 it is determined whether or not a sound flag is on. If the determination is on, the sound data to be outputted is selected at a step 292. The selected sound data is read-processed at a step 293, and then the process returns to the main routine. Incidentally, the sound data of a message thus read is digital-analog converted by the sound generating circuit 16 to be outputted as sounds.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a video game system having a controller operated by a player, and video game apparatus for use in connection with a display device that displays image data and outputs sounds, said video game machine outputting image data for changing display images in accordance with a program, in response to operation of said controller and to generate a display portraying a three-dimensional world in a three-dimensional based video game, said controller including a direction instructing member that instructs a moving direction of a player object that is varied in movement on a screen by operation of the player to control movement in the three-dimensional world including movement in a depth direction, and a plurality of control switches for controlling the player object in said three-dimensional world, said video game apparatus comprising:

a player object image data generator that generates data for displaying a player object;

an influencing object image data generator that generates image data for displaying a movable influencing object image that is displayed in the vicinity of an advancing direction of the player object, said influencing object being variably displayed to first appear and then to move in a predetermined manner with respect to said player object under program control when said player object is controlled to be located in the vicinity of a site in the three-dimensional world where the player object can advance in accordance with said program, said influencing object being operable to have an affect on the player object depending upon a player's manipulation of said controller;

a message generator for associating text messages defining a way of manipulating said controller to respond to said influencing object with sites in the three-dimensional world to which a player object may be moved, said message generator outputting a text message indicative of which one of said plurality of control switches for a player to manipulate to respond to said influencing object so as to assist the player in successfully progressing in said three-dimensional based video game, said text message being output when the player object is in the vicinity of one of said sites where the player object can advance; and an output control circuit that combines the player object image data and the influencing object image data to generate an output supplied to said display device whereby the player object and the influencing object are displayed on the screen of said display device and a text message indicative of a way to respond to said influencing object is output to said display device.

2. A video game apparatus according to claim 1, wherein said message data generator generates the text message of instructing a player as to which controller switch is to be operated and information indicative of the function of the switch.

3. A video game apparatus according to claim 1, wherein said message data generator generates a text message for instructing a player as to which controller switch is to be operated and the number of operations of the controller switch.

4. A video game apparatus according to claim 1, wherein said message data generator generates character data for displaying, in characters, the text message indicative of a way of operating said controller on the screen of said display device.

5. A video game apparatus according to claim 1, wherein said display device includes a sound generating circuit for generating sounds, said message data generator generates a sound signal for outputting, in sound, a message relating to the way of operating said controller.

6. A video game apparatus according to claim 1, wherein said display device is a television type display and further comprising a stationary object image data generator that generates image data for displaying a stationary object that is displayed in the vicinity of an advancing direction of the player object that has no affect upon the player object, said output control circuit combines the stationary object image data with the image data of the player object and the influencing object to generate an output.

7. For use with a video game system having a controller including a direction instructing member for instructing a moving direction of a player object varying in motion on a screen by operation of a player to control movement in a three-dimensional world including movement in a depth direction and a plurality of control switches for controlling the player object in said three-dimensional world, and a video game processing system for supplying, to a display device, image data for causing variation in a display image, based on a program, in response to operation of said controller and to generate a display portraying a three-dimensional world in a three-dimensional based video game, wherein a video game memory medium stores a program for a game image display processed by said video game processing system video game memory medium comprising:

a player object image data generating program encoded in said video game memory medium for generating image data including polygon data for displaying the player object;

an influencing object image data program encoded in said video game memory medium for generating image data including polygon data for displaying an influencing object image in the vicinity of an advancing direction of the player object such that the influencing object moves in a predetermined manner with respect to said player object when said player object is controlled to move the player object in the vicinity of a site in the three-dimensional world where the player object can advance, said influencing object being operable to have an affect upon the player object;

a message data generating program encoded in said video game memory medium for associating text messages defining a way of manipulating said controller to respond to said influencing object with sites in the three-dimensional world to which a player object may be moved, said message generating program outputting a text message indicative of which one of said plurality of control switches for a player to manipulate to respond to said influencing object so as to assist a player in successfully progressing in said three-dimensional based video game, said text message being output when the player object is in the vicinity of a position of one of said sites in the three-dimensional world where the player object can advance; and an output program encoded in said video game memory medium for combining the player object image data with the influencing object image data to supply to said display device based on the player object image data generating program and the influencing object image data generating program, and outputting the text message on the way to respond to said influencing object to said display device based on the message data generating program.

8. A video game memory medium according to claim 7, wherein said message data generating program is operable to generate character data for displaying, in characters, the text message for operating the controller on the screen of said display device.

9. A video game memory medium according to claim 7, wherein said message data generating program generates a sound signal for outputting, in sound, a message relating to the way of operating said controller.

10. In a video game system having a controller operated by a player, and video game apparatus for use in connection with a display device that displays image data and outputs sounds and generates a display portraying a three-dimensional world in a three-dimensional based video game, said video game apparatus outputting image data for changing display images in accordance with a program, in response to operation of said controller said controller including a direction instructing member that instructs a moving direction of a player object that is varied in movement on a screen by the player to control movement in the three-dimensional world including movement in a depth direction, and a plurality of control switches for controlling the player object in said three-dimensional world, said video game apparatus comprising:

a player object image data generator that generates image data including polygon data for displaying a player object;

an influencing object image data generator that generates image data including polygon data for displaying a movable influencing object image that is displayed in the vicinity of an advancing direction of the player object, said influencing object being variably displayed to first appear at a display position related the position of said player object when said player object is controlled to move in the vicinity of a site in the three-dimensional world where the player object can advance in accordance with said program and being operable to have an affect on the player object depending upon a player's manipulation of said controller;

a player assisting data generator that generates assisting data for helping the player object when the player object is displayed in the vicinity of a site in the three-dimensional world having a predetermined relationship to a display position of the influencing object, said player assisting data generator for associating text messages defining which one of said plurality of control switches to manipulate with sites in the three-dimensional world to respond to said influencing object so as to assist a player in successfully progressing in said three-dimensional based video game, said text message being output when the player object is in the vicinity of one of said sites where the player object can advance; and an output control circuit that combines the player object image data generated by said player object image data generator and the influencing object image data to provide an output to be supplied to said display device whereby the player object and the influencing object are displayed on the screen of said display device and assisting data is displayed on the display device screen.

11. A video game apparatus according to claim 10, wherein said assisting data is a message, that is effective to assist the player object in combating the influencing object, in one of the communication forms of characters or sounds.

12. A video game according to claim 10, wherein said player assisting data generator displays an assisting item helpful for advancing a game to allow the assisting item to be acquired by a player.

13. A video game system according to claim 10, wherein said assisting data generating means allows a best required kind of an assisting item to be acquired based on a state of the player object when said predetermined switch is operated.

14. A video game apparatus comprising: a controller including a direction instructing member for instructing a moving direction of a player object to vary in motion on a screen by operation of a player and a plurality of control switches for controlling the player object so as to be operated by the player, said video game apparatus being operable to supply to a display device, image data for causing variation in a display image, based on a program, in response to operation of said controller, a player object image data generator for generating image data for displaying the player object;

an influencing object image data generator for generating image data for displaying an influencing object image that is displayed in the vicinity of an advancing direction of the player object to have an effect upon the player object as determined by a program;

an assisting data generator for generating assisting data for helping the player object successfully progress in the game when the player object is displayed at a position having a predetermined relationship to a display position of the influencing object, said assisting data generator generating a text message which 1) is indicative of one of said plurality of switches for a player to manipulate and 2) is indicative of an operational function the player is being prompted to perform; and an output control circuit that combines the player object image data generated from said player object image data generator and the influencing object image data to provide an output to be supplied to said display device whereby the player object and the influencing object are displayed on the screen of said display device and assisting data is displayed on the display device screen.

15. A video game apparatus according to claim 14, further including a graphics processor for displaying said player object and said influencing object in an apparent three-dimensional world.

16. A video game according to claim 14, wherein said player object image generator includes a player object image generating program and said influencing object generator includes an influencing object generating program, which are encoded to respectively display said player object and said influencing object in an apparent three-dimensional world.

17. For use with a video game system having a controller including a direction instructing member for instructing a moving direction of a player object to control movement in a three-dimensional world including movement in a depth direction and a plurality of control switches for controlling the player object in said three-dimensional world, and a video game processing system for supplying, to a display device, image data for causing variation in a display image, based on a program, in response to operation of said controller and for generating a display portraying a three-dimensional world in a three-dimensional based video game, a method of operating said video game system comprising the steps:

displaying, using polygon data, the player object in a three-dimensional world, said player object being controllable by the direction instructing member for instructing a moving direction in the three-dimensional world;

determining whether a player object has reached a predetermined site in the three-dimensional world portrayed in a display;

displaying, using polygon data, a movable influencing object image when said player object is determined to be in the vicinity of said predetermined site; said influencing object being movable under program control and being operable to have an affect upon the player object under program control;

accessing a memory and associating text messages defining a way of manipulating of said plurality of control switches to respond to said influencing object with sites in the three-dimensional world;

retrieving from said memory a text message corresponding to said predetermined site detected, said text message being retrieved when the player object is in the vicinity of a said predetermined site where the player object can advance, said text message being indicative of which one of said plurality of control switches for a player to manipulate to respond to said influencing object so as to assist a player in successfully progressing in said three-dimensional based video game, said text message being output when the player object is in the vicinity of said predetermined; and outputting the text message to said display device.

18. A method according to claim 17, further including the step of generating character data on the screen of said display device for displaying, in characters, a text message instructing a player as to which controller switch is to be operated and information indicative of a function the player is being prompted to perform.

19. A method according to claim 17, further including the step of generating a sound signal for outputting, in sound, a message relating to the way of operating said controller.

20. For use with a video game system having a controller including a direction instructing member for instructing a moving direction of a player object to control movement in a three-dimensional world including movement in a depth direction and a plurality of control switches for controlling the player in said three-dimensional world, and a video game processing system for supplying, to a display device, image data for causing variation in a display image, based on a program, in response to operation of said controller and for generating a display portraying a three-dimensional world, a method of operating said video game system comprising the steps:

displaying a player object in a three-dimensional world, said player object being controllable by the direction instructing member for instructing a moving direction in the three-dimensional world;

determining whether a player object has reached a predetermined site in the three-dimensional world portrayed in a display;

displaying a movable influencing object image when said player object is determined to be in the vicinity of said predetermined site; said movable influencing object being movable under program control and being operable to have an affect upon the player object under program control;

accessing a memory and associating text messages defining a way of manipulating said plurality of control switches to respond to said influencing object with sites in the three-dimensional world;

retrieving from said memory a first message corresponding to said predetermined site detected, said message being retrieved when the player object is in the vicinity of said predetermined site where the player object can advance;

indicating a way of manipulating a first one of said plurality of control switches to respond to said influencing object;

displaying said first message;

determining whether said player object is displayed in a second predetermined site in said three-dimensional world;

accessing said memory to generate a second message indicating a way of manipulating a second one of said plurality of control switches to respond to said influencing object when the player object is in the vicinity of a second predetermined site in the three-dimensional world where the player object can advance; and displaying said second message.

21. A method according to claim 20, further including the steps of combining the player object image data with the influencing object image data to supply to said display device, and outputting at least one of said first message and said second message and the combined player object image data and the influencing object image data to said display device.

22. A method according to claim 20, wherein said step of generating a first message includes the step of generating character data on the screen of said display device for displaying, in characters, the message for operating the controller.

23. A method according to claim 20, wherein said step of generating a first message includes the step of generating a sound signal for outputting, in sound, the message on the way of operating said controller.

24. A method according to claim 20, further including the step of generating a display which portrays said player object and said influencing object in an apparent three-dimensional world.

25. For use with a video game system having a controller including a direction instructing member for instructing a moving direction of a player object and a plurality of control switches for controlling a player object based upon the operation by a player, and a video game processing system for supplying, to a display device, image data for causing variation in a display image, based on a program, in response to operation of said controller, a method of operating said video game system comprising the steps:

displaying a player object on said display device;

detecting whether the player object is displayed in the vicinity of a first predetermined display position on said display device;

displaying an influencing object which is movable under program control and is displayed in the vicinity of said first predetermined position and is operable to have an affect upon the player object under program control;

accessing a text message associated with said player object which 1) is indicative of one of said plurality of switches for a player to manipulate and 2) is indicative of a function the player is being prompted perform; and outputting the text message, for display with the player object and the influencing object.

26. A method according to claim 25, wherein said message includes character data which is displayed on the screen of said display device for operating the controller.

27. A method according to claim 25, wherein said message includes a sound signal for indicating a way to operate said controller.

28. A method according to claim 25, further including the step of generating a display which portrays said player object and said influencing object in an apparent three-dimensional world.

* * * * *